United States Patent
Carlson et al.

(10) Patent No.: US 6,650,704 B1
(45) Date of Patent: Nov. 18, 2003

(54) METHOD OF PRODUCING A HIGH QUALITY, HIGH RESOLUTION IMAGE FROM A SEQUENCE OF LOW QUALITY, LOW RESOLUTION IMAGES THAT ARE UNDERSAMPLED AND SUBJECT TO JITTER

(75) Inventors: Randolph S. Carlson, Carson City, NV (US); Jack L. Arnold, Irvine, CA (US); Valentine G. Feldmus, Irvine, CA (US)

(73) Assignee: Irvine Sensors Corporation, Costa Mesa, CA (US)

( * ) Notice: Subject to any disclaimer, the term of this patent is extended or adjusted under 35 U.S.C. 154(b) by 0 days.

(21) Appl. No.: 09/427,384

(22) Filed: Oct. 25, 1999

(51) Int. Cl.⁷ ............................ H04N 11/04; H04N 7/12
(52) U.S. Cl. ............................ 375/240.01; 375/240.11; 375/240.18
(58) Field of Search .................. 375/240.01, 240.18, 375/240.16, 240.19, 240.11; 382/252, 300, 270, 303, 260, 284, 294, 236, 299; 348/699, 458, 409, 410, 411; H04N 11/04

(56) References Cited

U.S. PATENT DOCUMENTS

| | | |
|---|---|---|
| 4,587,621 A | 5/1986 | DuVall |
| 4,720,745 A | 1/1988 | DeFortest et al. |
| 4,729,025 A | 3/1988 | Yanase |
| 4,750,211 A * | 8/1988 | Wray .......................... 382/303 |
| 4,816,913 A | 3/1989 | Harney et al. |
| 5,025,394 A * | 6/1991 | Parke .......................... 345/475 |
| 5,125,042 A | 6/1992 | Kerr et al. |
| 5,212,546 A * | 5/1993 | Arazi et al. .................. 358/518 |
| 5,259,040 A | 11/1993 | Hanna |
| 5,448,053 A | 9/1995 | Rhoads |
| 5,566,251 A | 10/1996 | Hanna et al. |
| 5,572,608 A | 11/1996 | Edgar |
| 5,604,601 A | 2/1997 | Edgar et al. |
| 5,608,538 A | 3/1997 | Edgar et al. |
| 5,644,513 A | 7/1997 | Rudin et al. |
| 5,649,032 A | 7/1997 | Burt et al. |
| 5,657,402 A | 8/1997 | Bender et al. |
| 5,666,215 A | 9/1997 | Fredlund et al. |
| 5,767,987 A | 6/1998 | Wolff et al. |
| 5,771,317 A | 6/1998 | Edgar |
| 5,793,379 A | 8/1998 | Lapidous |
| 5,809,174 A | 9/1998 | Purcell et al. |
| 5,835,160 A | 11/1998 | Chen et al. |
| 5,859,668 A | 1/1999 | Aono et al. |
| 5,861,924 A | 1/1999 | Pan et al. |
| 5,920,657 A | 7/1999 | Bender et al. |
| 6,009,213 A * | 12/1999 | Miyake ....................... 382/300 |
| 6,017,157 A | 1/2000 | Garfinkle et al. |
| 6,075,905 A | 6/2000 | Herman et al. |
| 6,121,966 A | 9/2000 | Teodosio et al. |
| 6,133,985 A | 10/2000 | Garfinkle et al. |
| 6,285,804 B1 * | 9/2001 | Crinon et al. ................ 382/299 |

\* cited by examiner

*Primary Examiner*—Vu Le
*Assistant Examiner*—Behrooz Senfi
(74) *Attorney, Agent, or Firm*—Myers Dawes & Andras; Joseph C. Andras

(57) ABSTRACT

A method of processing low resolution input frames containing undersampled views of an optically imaged scene to produce a higher quality, higher resolution output frame. This method operates by obtaining a sequence of low resolution input frames containing different undersampled views of an optically imaged scene. With regard to each new low resolution input frame, the method involves the further steps of measuring a displacement between a previous low resolution input frame and a new low resolution input frame to sub-pixel precision to produce a measured displacement; coarsely registering a high resolution working frame with the new low resolution input frame based on the measured displacement; finely registering the new low resolution input frame with the high resolution working frame by expanding the new low resolution input frame into a new high resolution input frame based on the measured displacement; and merging the new high resolution input frame into the high resolution working frame to produce an output frame.

13 Claims, 12 Drawing Sheets

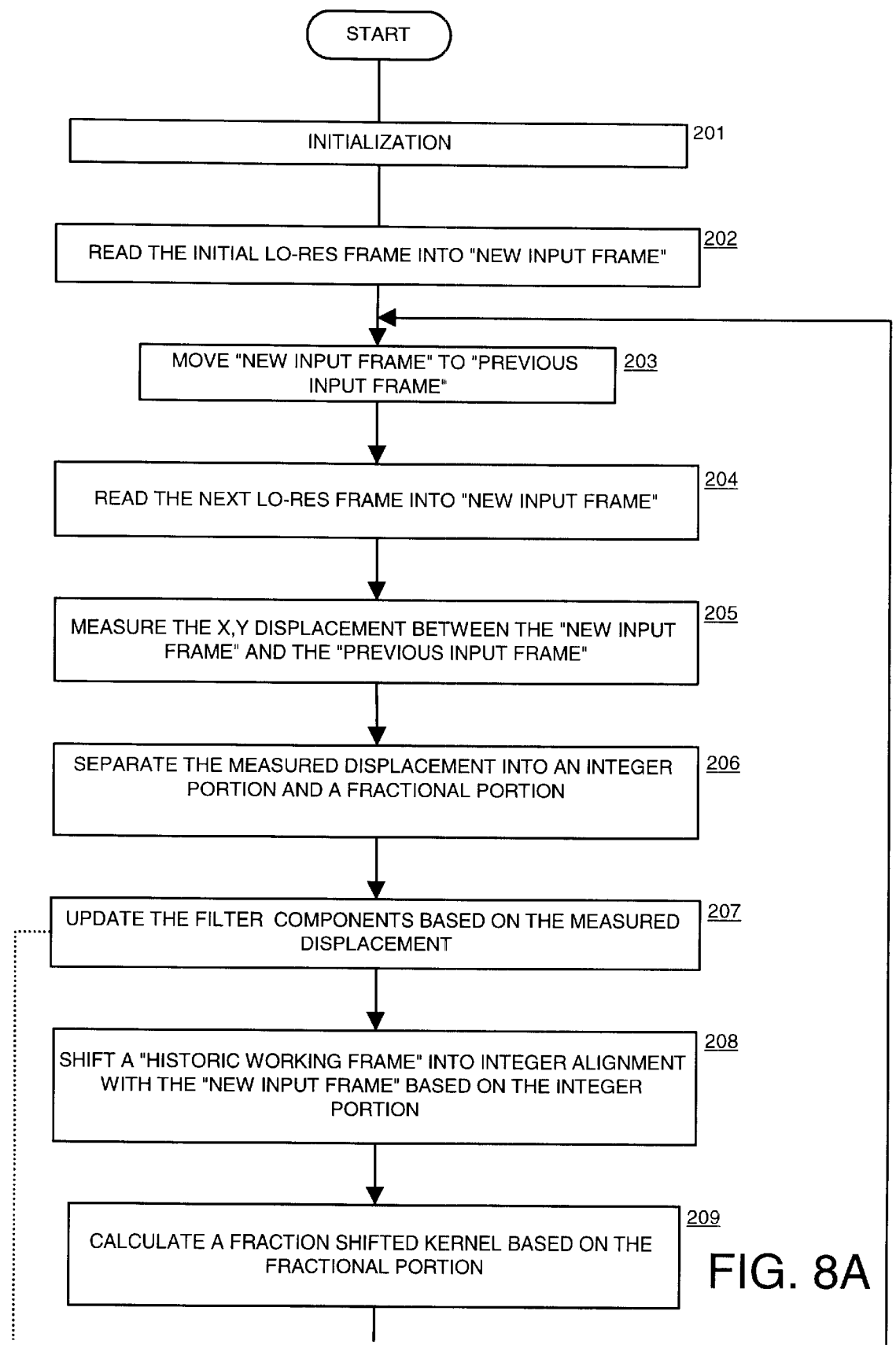

METHOD OF PRODUCING A HIGH QUALITY, HIGH RESOLUTION IMAGE FROM A SEQUENCE OF LOW QUALITY, LOW RESOLUTION IMAGES THAT ARE UNDERSAMPLED AND SUBJECT TO JITTER

BACKGROUND OF THE INVENTION

1. Field of the Invention

The invention relates generally to digital image processing and, more particularly, to a method of using a sequence of low resolution that are subject to random jitter and contain undersampled features or scenes to produce one higher quality, higher resolution as a still image or to produce a sequence of such higher resolution frames as a video image.

2. Discussion of Related Art

Images may be defined in terms of both "resolution" and "detail" with relevance to this invention. "Resolution" is a term that has taken on two different meanings in the image processing community. Strictly speaking, resolution refers to the number of pixels packed into a certain length or area. This application, however, uses resolution in the more general and perhaps more common sense, i.e. to refer to the sheer number of pixels in an image. Accordingly, one might regard a low resolution frame as a low pixel count frame (LPC frame) and a high resolution frame as a high pixel count frame (HPC frame).

"Detail" generally refers to the fine image elements that can be distinctly perceived within an image. One image might distinctly display a series of tightly spaced lines. Another image might "blur" those lines into a patch of gray fuzz. The first image has more detail than the second, i.e. it has higher "spatial frequency." The image resolution puts an upper cap on the amount of fine detail that can be displayed, but the bottleneck on detail is often unrelated to resolution.

Image data often does not contain as much fine detail as desired for an intended use. Numerous examples exist with respect to both video and still images. A news video of a car chase may be smeared and jittery because of the long distance between the airborne camera and the subject, and because of the instability of the helicopter that carries the camera. An image derived from a security video of a crime scene may be so coarse and so smeared that identification of the suspect is difficult, if not impossible. An x-ray image at an airport check-in facility may be so coarse that the operator misses the wires in an explosive triggering device. An image from a video camera at a law enforcement site or toll road entry may be too coarse to recognize the alphanumeric digits on a license plate. An infrared image from a military reconnaissance video may be too coarse and jittery to identify vehicles on the ground.

Light emitted or reflected from a subject is an "analog" phenomena since the available range of colors and intensities is a smooth, continuous function. An imaging system (such as a camera) uses some sort of optical system to gather some of the light diverging from the subject and then form an image of the subject on an image sensor. The spatial details within the optical image are limited only by optical aberrations inserted by the optical imaging elements and by the finite wavelengths of the light involved. The optical image, therefore, is generally not the limiting factor in terms of reproducing spatial detail. A loss of detail generally occurs where an image sensor is interfaced to the optical image, i.e. at the point of converting the optical image into an analog or digital electronic image signal.

An exemplary and direct-to-digital image sensor is a CCD chip having an two-dimensional array of electrodes or, more generally speaking, sensor elements. Ideally speaking, the sensor elements would be as small as possible in order to capture all of the available detail provided by the optical image and packed together as closely as possible to capture the image with as much efficiency as possible.

A real-world sensor, however, has sensor elements of measurable size and spacing that tend to cause certain imaging limitations. Simply put, the typical image sensor produces a low resolution frame (i.e. low pixel count frame) because its sensor elements are not infinitely small and not infinitely dense.

In many of the examples cited above, therefore, the high spatial frequencies (fine details) in the optical image are presented to relatively large sensor elements. As such, the image sensor is unable to capture all of the available detail in a single LPC frame, and until now, no practical video processing was available to analyze two or more LPC frames in order to recover such detail and transfer such detail to one or more high pixel count frames (HPC frames).

There have been previous attempts to increase the stability of video sequences, but these have not exploited the jitter in the original scene to create higher resolution. Commercial video cameras available to consumers have crude electronic stabilization capability, but do not significantly increase the resolution of the video produced. Video editing systems may electronically "zoom" or "upsample" the frames, and they may stabilize the zoomed frames based on prior frames, but they do not use image data from the prior frames to improve the spatial details in the zoomed frame.

The post-production electronic zoom processes known to these inventors either magnify the pixels without upsampling the "zoomed" video at all, or they apply an ordinary interpolation algorithm to each independent LPC frame to produce a corresponding HPC frame of generally lesser quality. The first example results in a blocky image, sometimes referred to as "pixelation" or "the jaggies". The second method results in an excessively smoothed or blurred image lacking the spatial details and edge definition that was present in the optical image that was impinging on the image sensor during the formation of the LPC frame.

There are "up-converters" for HDTV (High Definition Television) that receive standard, lower resolution television sequences and produce higher resolution sequences. The inventors are unaware of any public literature regarding the operation of these up-converters. It is believed, however, that these up-converters create HPC frames on a frame-by-frame basis, interpolating the high resolution data in each HPC frame from the lower resolution data of a single LPC frame. Edges may be estimated and inserted to make the HPC frames appear of higher quality, but it does not appear that the edges are developed with image data hidden in a sequence of LPC frames.

The preceding consumer products try to improve jittery, low pixel count video, but they do not exploit spatial detail that is hidden within a jittery succession of LPC frames. However, various military projects have both stabilized and increased the spatial frequency of video sequences based upon the jitter of the source video. One approach developed by the Air Force is generally described in "High-resolution Image Reconstruction From a Sequence Rotated and Translated Frames and its Application to an Infrared Image" by Russell C. Hardie, et al. in *Opt. Eng.*, 37(1), 1998. The Air Force technique derives frame-to-frame motion from a complex series of multiple trial and error registrations. In essence, each new video frame is moved multiple times relative to an underlying "stack" of already aligned frames in order to finally ascertain the amount of frame-to-frame motion or jitter that was imparted to the new frame. Accordingly, detail from successive LPC frames may be combined, but only by trying to precisely register each new frame by using multiple iterations of full frame shift and compare operations that are time consuming and processor intensive. This trial and error approach obviously has limited, real-time uses.

There remains a need, therefore, for a method of image enhancement that addresses the above issues and provides a higher quality, higher pixel count frame without requiring multiple iterations of frame registration algorithms. In the context of still images, there is a need for images having a higher resolution than that provided by single frame capture from native camera video and containing more of the spatial detail that was present in the originally imaged scene, but not captured by any one LPC frame. In the context of moving images, there is a need for higher quality and higher pixel count video sequence than that provided directly by the camera and for a video sequence that is relatively free of jitter, or for both.

OBJECTS AND ADVANTAGES

Accordingly, several objects and advantages of our invention are:

1. To stabilize video and simultaneously allow for electronic zoom or upsampling at a higher pixel count;
2. To increase the quality and pixel count of frames in a video sequence using a simple and computationally efficient algorithm that operates in real-time;
3. To stabilize the frames in a video sequence using a simple and computationally efficient algorithm that operates in real-time;
4. To perform electronic zoom without pixelation while recovering detail that was contained in the original optical image, but not present in any single frame; and
5. To upsample portions of standard TV sequences to HDTV while recovering detail that was contained in the original optical image, but not present in any single frame.

Further objects and advantages of our invention will become apparent from consideration of the drawings taken together with the description of the preferred embodiment.

DESCRIPTION OF DRAWINGS

The just summarized invention may best be understood with reference to the Figures of which.

SUMMARY

The invention may be generally regarded as a method of operating on a succession of jittery, low resolution input frames to produce a higher quality, higher resolution output frame. The invention may produce a high resolution output frame as a single still image, or may produce a series of high resolution output frames as a video sequence.

In a first aspect, the invention comprises a method of processing low resolution input frames containing undersampled views of an optically imaged scene to produce a higher quality, higher resolution output frame. This first aspect of the invention involves the step of obtaining a sequence of low resolution input frames containing different undersampled views of an optically imaged scene. Moreover, for each new low resolution input frame, the invention involves the further steps of measuring a displacement between a previous low resolution input frame and a new low resolution input frame to sub-pixel precision to produce a measured displacement; coarsely registering a high resolution working frame with the new low resolution input frame based on the measured displacement; finely registering the new low resolution input frame with the high resolution working frame by expanding the new low resolution input frame into a new high resolution input frame based on the measured displacement; and merging the new high resolution input frame into the high resolution working frame to produce an output frame.

In a second aspect, the invention may be regarded as a method of processing low resolution input frames containing undersampled views of an optically imaged scene to produce a higher quality, higher resolution output frames. Here, the method starts by obtaining a previous low resolution input frame containing a previous undersampled view of an optically imaged scene and obtaining a new low resolution input frame containing a new undersampled view of the optically imaged scene due that is different from the previous undersampled view. The method proceeds by measuring a displacement between the new and previous low resolution input frames to sub-pixel precision to produce a measured displacement; dividing the measured displacement into an integer displacement portion and a fractional displacement portion; providing a high resolution working frame; coarsely registering the high resolution working frame with the new low resolution input frame based on the integer displacement portion of the measured displacement; providing a kernel; fractionally adjusting the kernel based on the fractional displacement value to form a fraction-shifted kernel; finely registering the new low resolution input frame with the high resolution working frame by expanding the new low resolution input frame into a new high resolution input frame using the fractionally-shifted kernel; and merging the new high resolution input frame into the high resolution working frame.

DETAILED DESCRIPTION OF THE PREFERRED EMBODIMENT

A. Generally

Figure 1:
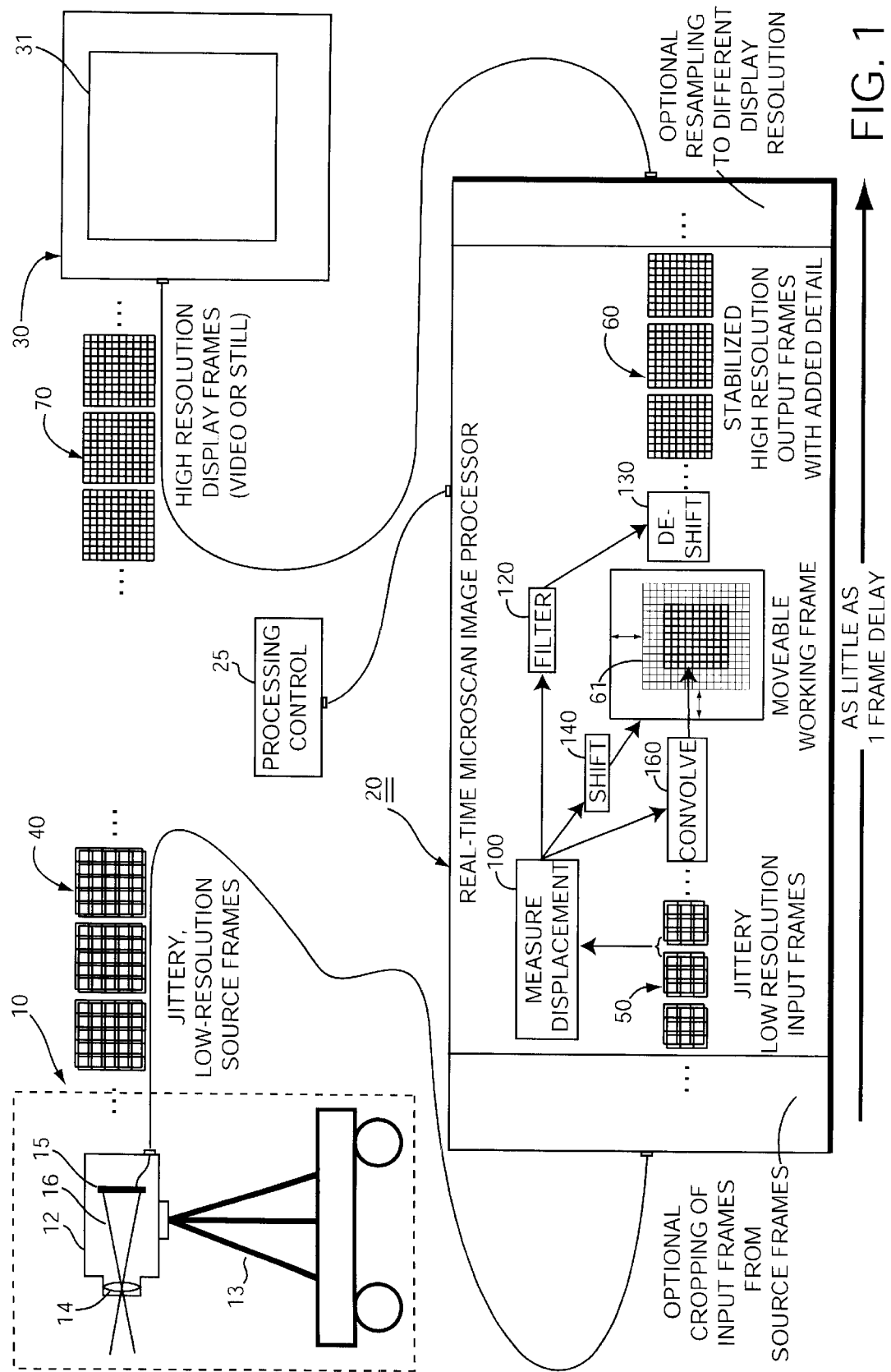
FIG. 1 is a fanciful diagram of a "microscanning" image processor 20 according to a presently preferred embodiment of this invention.

FIG. 1 shows an image processing apparatus 20 that implements an image processing method according to this invention. The image processing apparatus 20, figuratively shown between a video source 10 and a display device 30, receives jittery, low resolution input frames 50 and produces a one or more stable, high resolution output frames 60, a process that will sometimes hereafter be called "microscanning" for reasons that will become apparent.

The embodiment shown takes low resolution input frames 50 that are jittery and individually lacking in detail and converts them into high resolution output frames 60 of increased resolution and detail. One high resolution output frame 60 may be displayed as a still image or a sequence of output frames 60 may form a video image of increased resolution and detail. In either case, the HPC frames 60 will have significantly higher resolution and more detail than any one of the low-resolution input frames 50. In the case a video image, the sequence of HPC output frames 60 is delayed by only a few frames relative to the input frames 50 and exhibits significantly less jitter than the sequence of original input frames 50. In short, the system shown uses random jitter to improve image details and reduces the random jitter by using it. In lay terms, it takes lemons and makes lemonade.

In the most general case, the input frames 50 may or may not be coextensive with the source frames 40 provided by the video source 10 and the output frames 60 may or may not be coextensive with the display frames required by the display device 30. The apparatus 20 may be modified, therefore, to include a "front end" 21 and a "back end" 22. At its front end 21, the apparatus 20 may "crop" the low resolution input frames 50 from the source frames 40. At its back end 22, the apparatus 20 may resample (conventionally) the high resolution output frames 60 into display frames 70 of a different resolution for display on the display device 30 or for transfer to a memory device, recording device, or other storage device.

The image processing apparatus 20 may be implemented in a number of embodiments. As suggested by FIG. 1, for example, it may be a "black box" that operates with suitable hardware and firmware, and has appropriate connectors for video-in and video-out ports. As in the embodiment discussed below, however, it may also be implemented on a general purpose computer operating under the control of appropriate software including, for example, as a "plugin" that operates with existing software such as Adobe Premier.

As also shown in FIG. 1, a processing control block 25 may be used to implement suitable, user-controlled features such as varying the size and position of the cropped area, providing a zoom function of variable magnitude, varying the degree of microscanning, varying the direction and degree of conventional resampling, changing the image processing effect of the kernel, and so on.

The video source 10 outputs source frames 40 as a "raw" video stream. The particular video source 10 shown in FIG. 1 is a real-time, digital camera 12. The video source 10, however, could also be a data file that contains previously-acquired source frames 40 (as is the case with the embodiment discussed below), or a digitized version of real-time or previously-acquired output from an analog device such as an analog camera or conventional VCR. Whether produced in real-time or previously acquired, the image detail within the individual source frames 40 is often unsatisfactory because of an imperfect interface between the optical image and the electronic representations of that image produced by the camera 12 or by an analog to digital converter.

The problem is best understood in the context of the camera 12. As shown in FIG. 1, the typical camera 12 includes a lens system 14 that focuses an optical image 16 of the subject onto an image sensor 15. The typical image sensor 15 contains an array of sensor elements that each produce an output in proportion to the intensity of the optical image impinging at each element's location. In a charge coupled device (CCD), for example, each sensor element consists of a photosensor and a charge transfer circuit that work together to collect light over a period of time (a "frame time") and then convert the light level to a charge value.

Image details are lost because each individual sensor element is a rectangular sampler in space that has a finite size. As a result, each element has a sin $x/x^2$ frequency response with a zero-crossing frequency representative of its maximum ability to "see" image detail. If the optical image 16 has spatial frequencies that are higher than the zero-crossing frequency of the element's frequency response, the sensor will simply integrate those details into a single pixel without distinction or "alias" them to a lower frequency. Each element integrates the intensity value of all light hitting its face regardless of the complexity of the tonal content within that light. Simply stated, if the tiny image portion landing on the sensor element has two or more areas of contrasting tone, the element will merge those tones into a single tone and hide the detail.

The size of the sensor elements generally makes the detail gathering ability of current image sensors 15 quite coarse relative to the optical resolution. In other words, the lens system 14 generally offers more detail than the image sensor 15 can detect. Consequently, the optical image 16 puts extra intensity detail within the boundary of each sensor element, but each sensor element averages that detail into a single intensity value. In such case, the image sensor 15 is said to electronically "undersample" the optical image 16 provided by the lens system 14. Due to the resultant averaging, the intensity details landing on each low-resolution sensor element just "block" up and produce the jagged edges that are characteristic of an undersampled image. In short, the lens' higher resolution is normally wasted on the image sensor's lower resolution.

The present invention recovers image details that are enmeshed over time within the pixels of sequential input frames 50. Jitter is an important ingredient in making this possible. In particular, random jitter imparts valuable image information to the pixels in a sequence of low-resolution input frames 50. The present invention rapidly and accurately characterizes the jitter in order to extract the image information. In more detail, the invention measures jitter-induced displacement from one frame to the next, with sub-pixel precision, and then uses that displacement measurement to combine two or more LPC input frames 50 into the HPC output frames 60. In lay terms, the invention mathematically "sifts" the image details from the random, jitter-induced intensity variations in the low-resolution pixels making up the sequential input frames 50.

Random jitter is often present naturally. Such jitter is especially prevalent when the video source 10 is focused on long range subjects and the resulting optical image is focused on a coarse sensor that produces relatively low pixel count (LPC) source frames 40. Jitter is usually undesirable because it causes the source frames 40 to "bounce" around the subject. Such jitter, however, also divides the image details amongst the sensor elements in various ways from frame to frame such that several frames may contain more image detail than any one frame.

The random jitter may be natural or artificial (i.e. pseudo random). FIG. 1 shows a figurative video source 10 that is subject to natural jitter, i.e. a camera 12 carried by a moving platform 13 that is necessarily subject to vibration. Such vibration generally arises from overall platform movement, as in the case of an aircraft, a UAV, or a space vehicle, but may occur in other contexts. If the platform is relatively stationary, however, as with a wall mounted surveillance camera, an airport x-ray machine, and so on, the camera 12 may be intentionally subjected to random jitter. In either case, the jitter may be unknown since the displacement caused by the jitter is reactively characterized on a frame-by-frame basis as discussed further below. There is absolutely no need to "know" what the jitter looks like before the fact ("a priori"), as required with certain prior art systems.

B. The Preferred Embodiment

FIGS. 2–12 are directed to the presently preferred embodiment 20 that runs on a general purpose computer. This embodiment reads low-resolution source frames 40 from a data file, processes them, and ultimately outputs high-resolution display frames 70 to a display device 30. The computer, of course, is governed by suitable software. This software for this particular embodiment was written in "C", but any suitable programming language may be used. A complete copy of the source code is attached hereto as an Appendix.

Overview of Operation

FIGS. 2–5 illustrate some developmental background that may be helpful in understanding certain idiosyncratic details of this embodiment.

FIGS. 5, 6, 7 and 8 offer conceptual views of how the preferred embodiment operates. Each one provides a successively more detailed abstraction of the preferred embodiment—progressing from the simple block diagram of FIG. 5, to the frame-centric version of FIG. 6, to the time-based diagram of FIG. 7, and finally to the flow chart of FIG. 8 that is closely tied to the attached source code.

Figure 2:
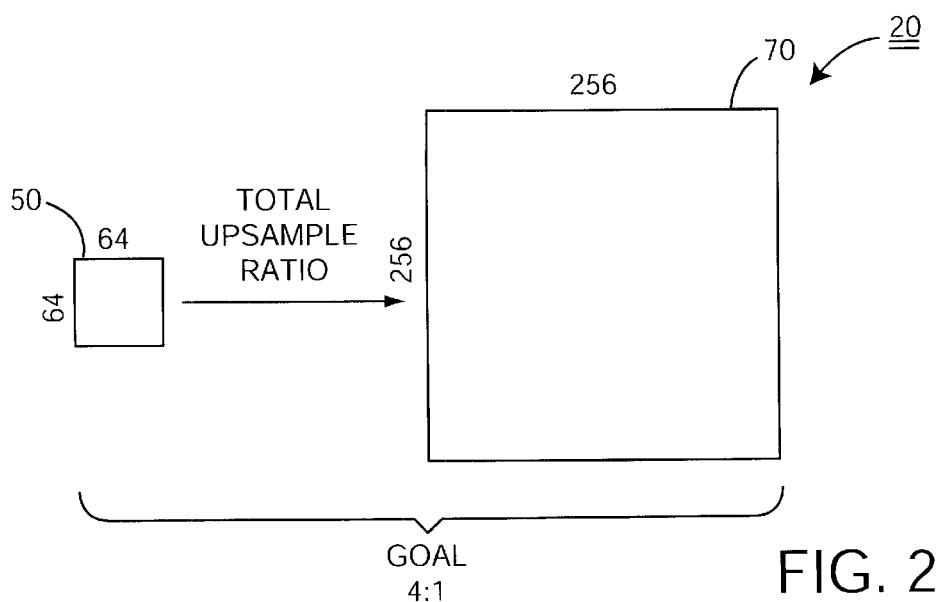
FIG. 2 is a fanciful diagram showing how the preferred system 20 transforms 64×64 input frames 50 into 256×256 display frames 70 at a pixel gain of 4:1.
Figure 3:
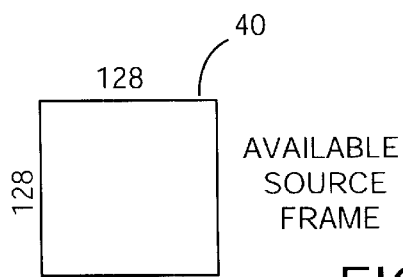
FIG. 3 shows a 128×128 source frame that is larger than the 64×64 input frame to be processed by the system 20 of FIG. 1.
Figure 4:
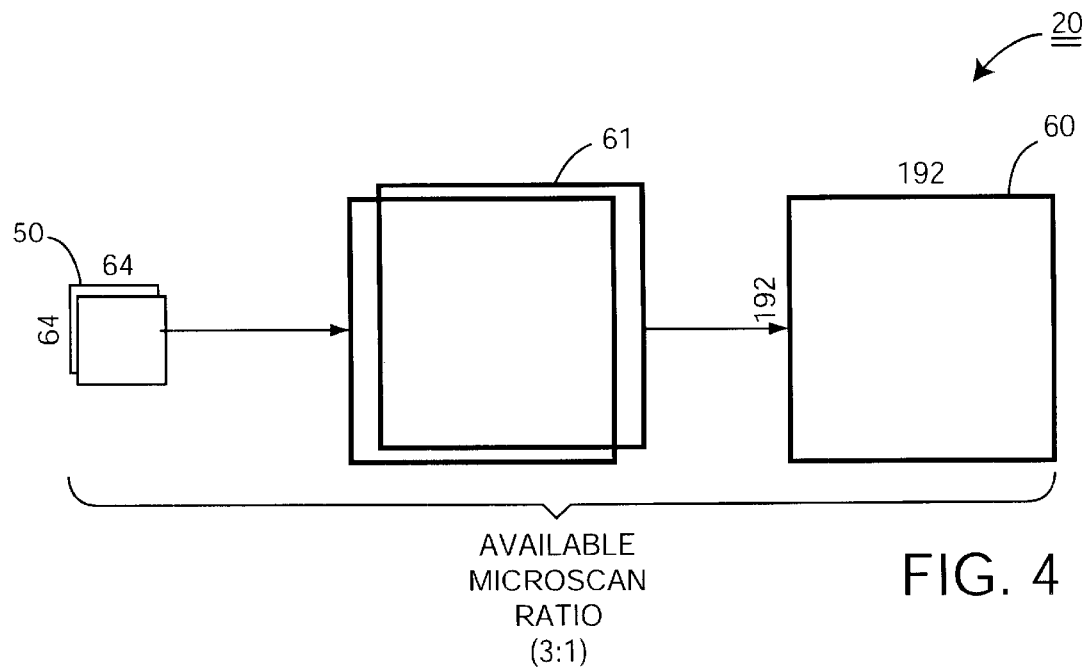
FIG. 4 shows a system 20 that was developed to microscan 64×64 input frames 50 into 192×192 output frames 60, i.e. at a pixel gain of 3:1 that is lower than the desired pixel gain of 4:1.
Figure 9:
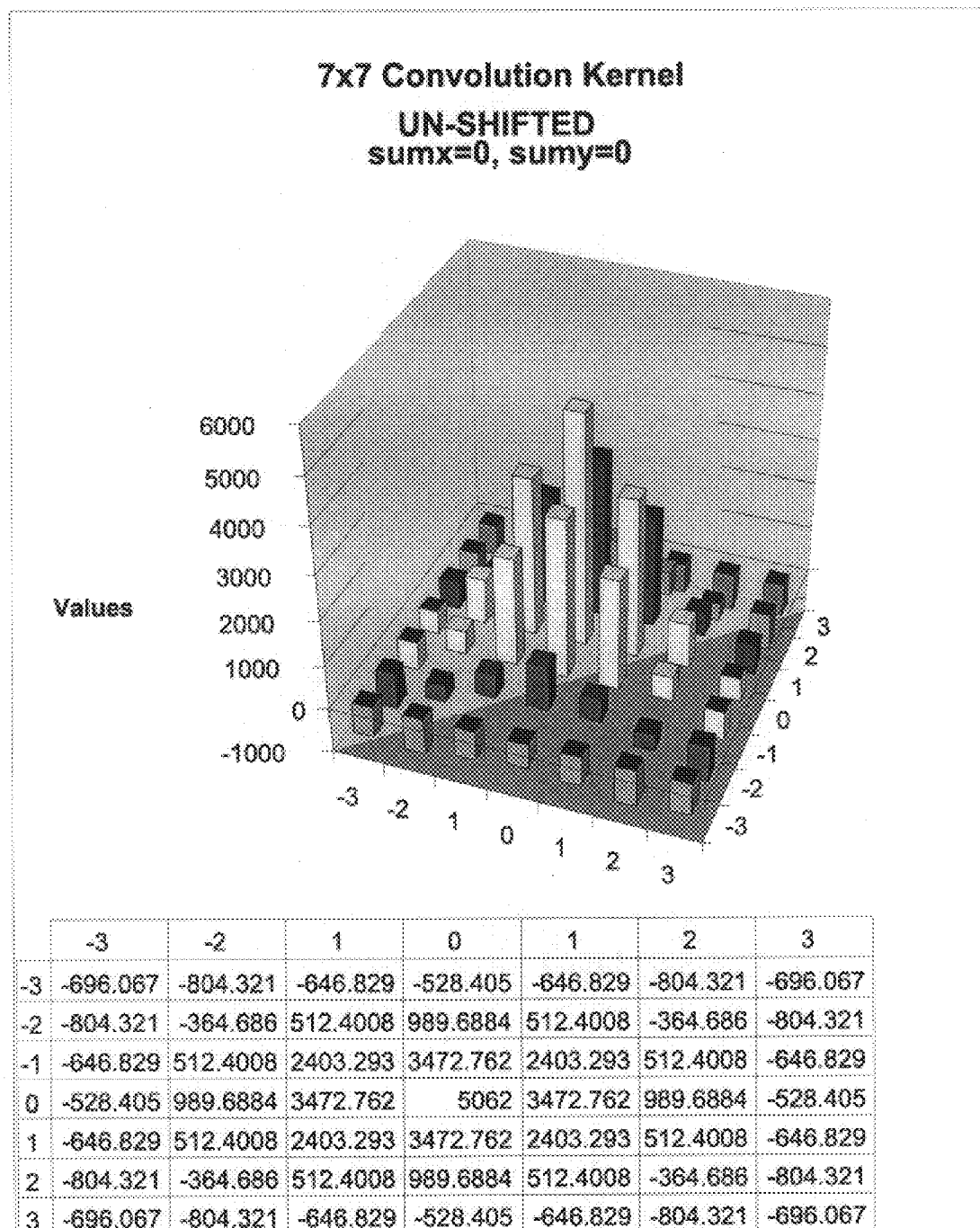
FIG. 9 is a graphical view of an un-shifted kernel.
Figure 10:
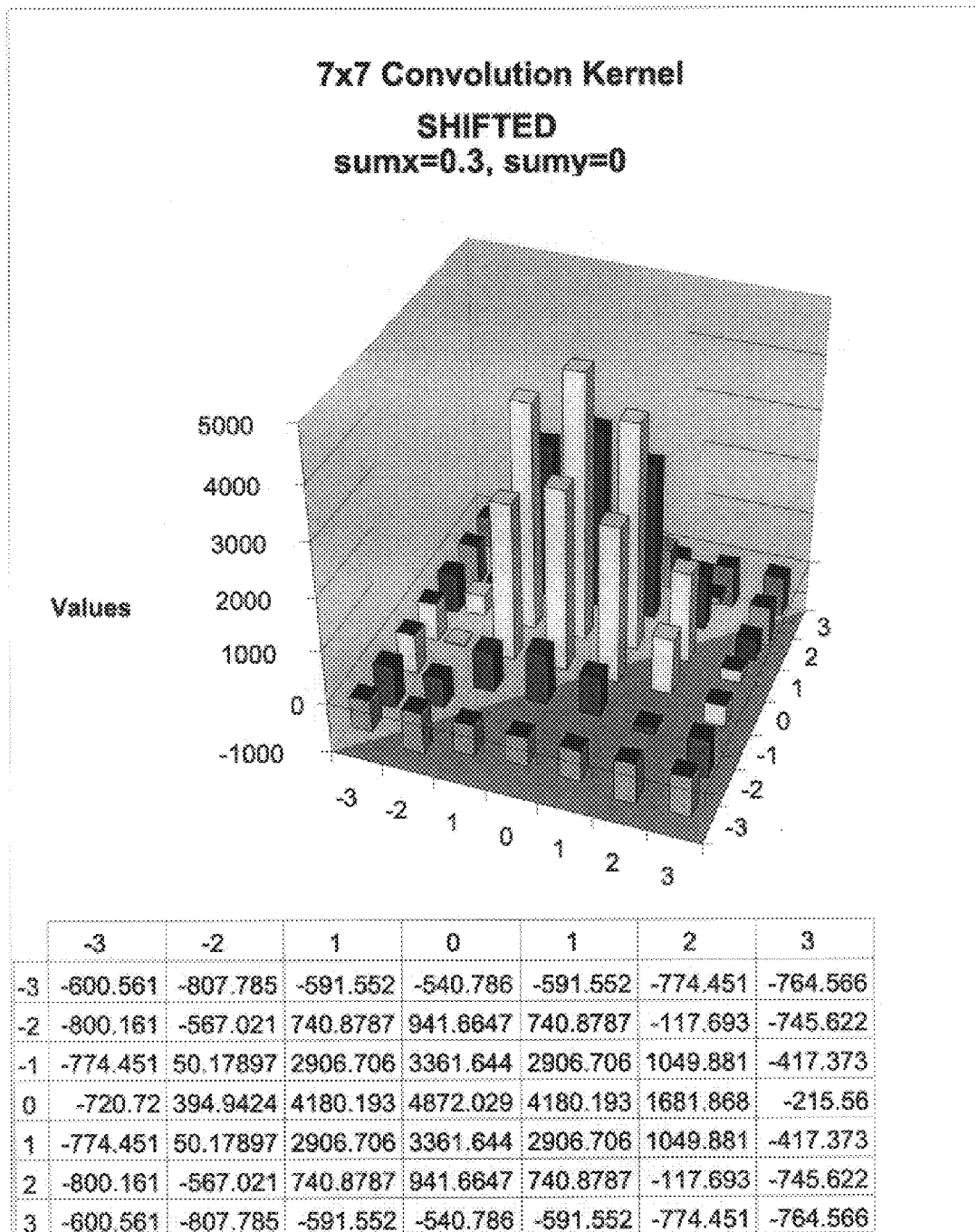
FIG. 10 is a graphical view of a kernel that has been fractionally-shifted with sumx=0.3 and sumy=0.0.
Figure 11:
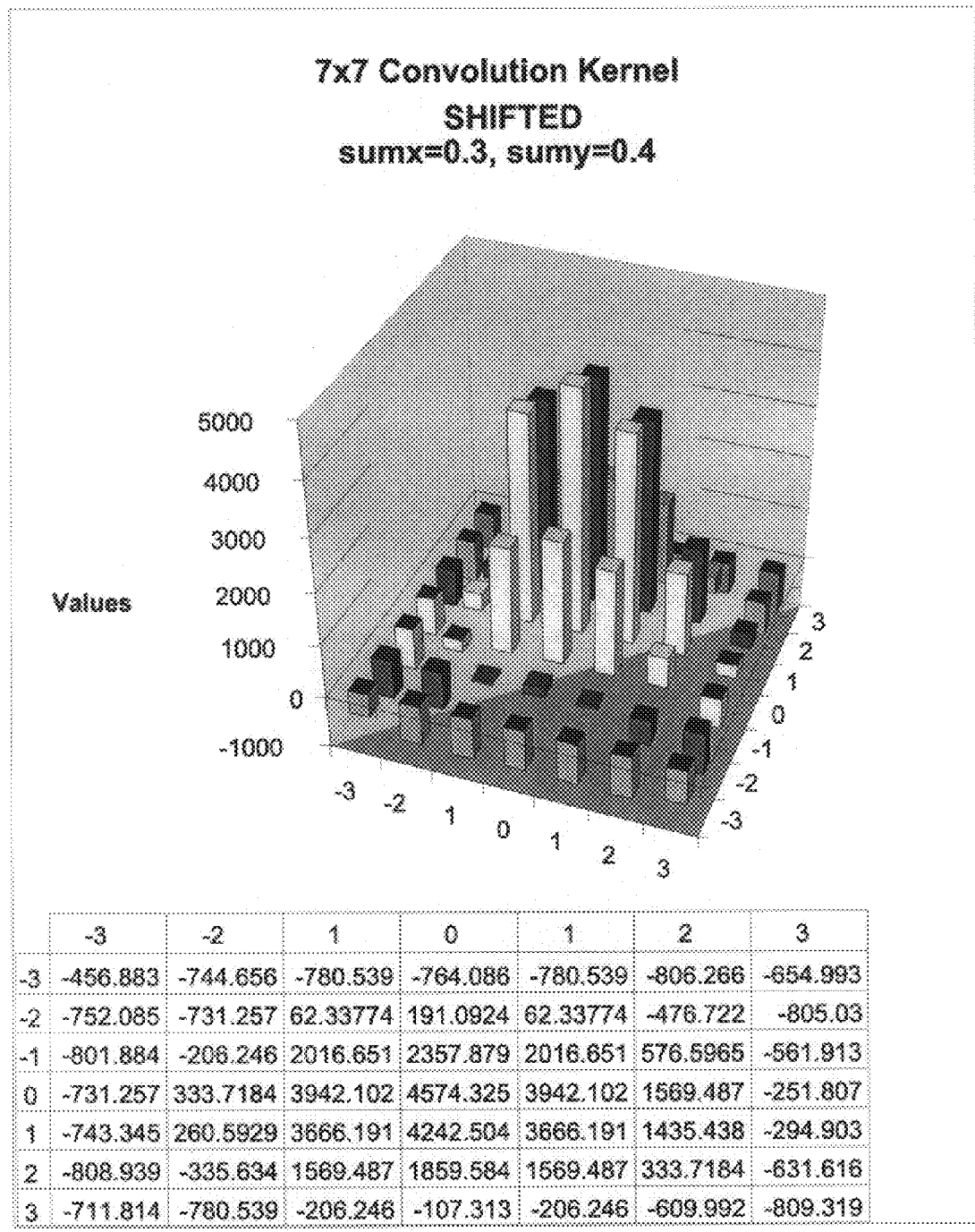
FIG. 11 is a graphical view of a kernel that has been fractionally-shifted with sumx=0.3 and sumy=0.4.
Figure 12:
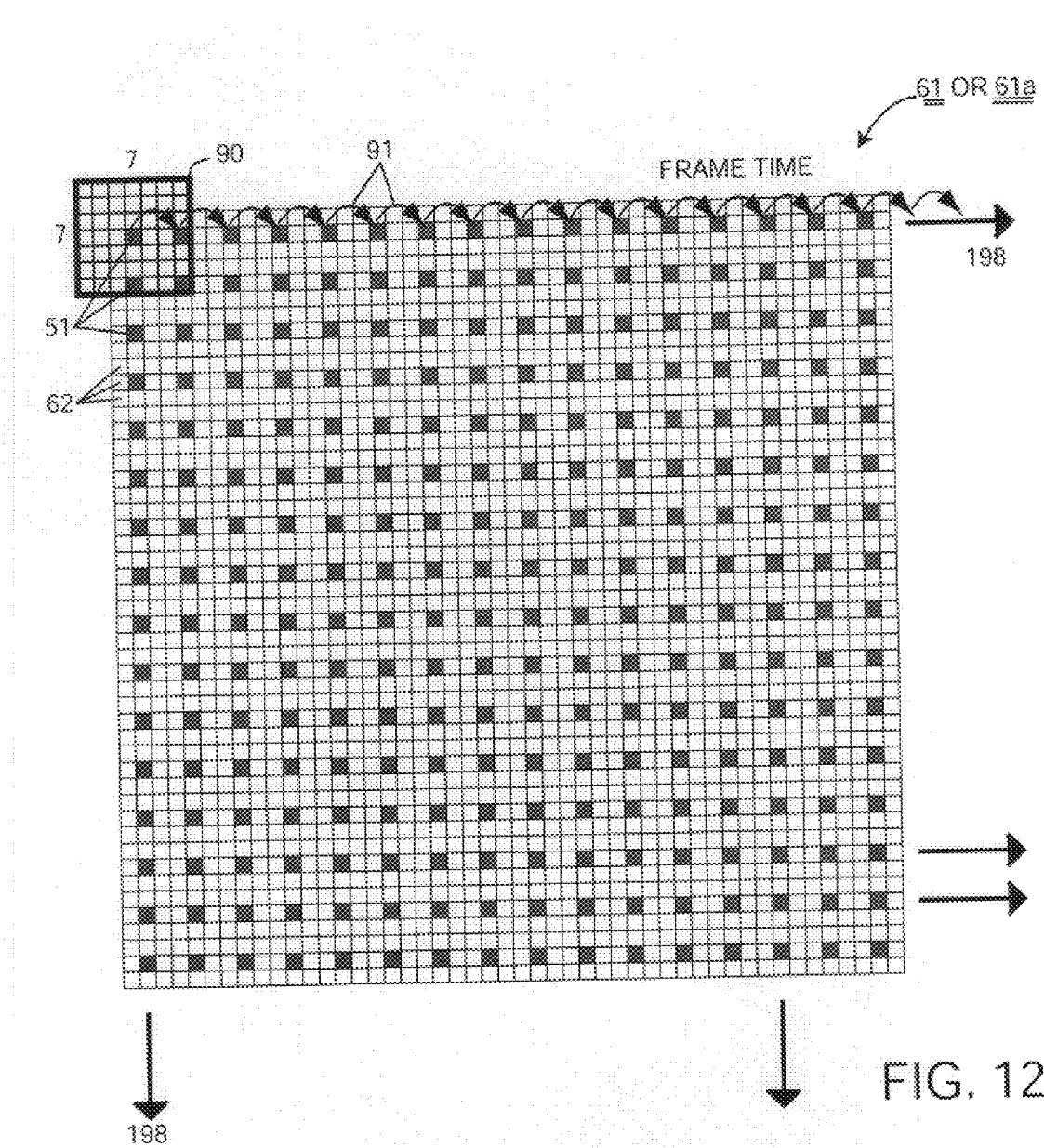
FIG. 12 illustrates a single placement of a kernel 90 and suggests subsequent placements by arrows 91 that expands the pixels 51 from a New Input Frame 50 into an Upsampled Input Frame 61a (or directly into a portion of the Working Frame 61).

FIG. 9 represents a 7×7 kernel used in this embodiment;

FIGS. 10 and 11 graphically represent two fractionally-shifted versions of the FIG. 9 kernel; and FIG. 12 graphically represents upsampling through convolution using a kernel 90 as exemplified by FIGS. 9–12;

FIGS. 2–4: The Frame Sizes

FIG. 2 is a fanciful diagram showing that one the goals of this particular embodiment is to transform 64×64 input frames 50 into 256×256 display frames 70—i.e. to achieve a pixel gain of 4:1. As shown in FIG. 3, however, the available image source 10 is a data file of 128×128 source frames 40. Moreover, as shown in FIG. 4, earlier development efforts had tuned the software to microscan 64×64 input frames 50 to produce 192×192 output frames 60, i.e. at a lower pixel gain of 3:1.

These various frame sizes and ratios may vary from embodiment to embodiment and are not essential to the invention.

FIG. 5

Figure 5:
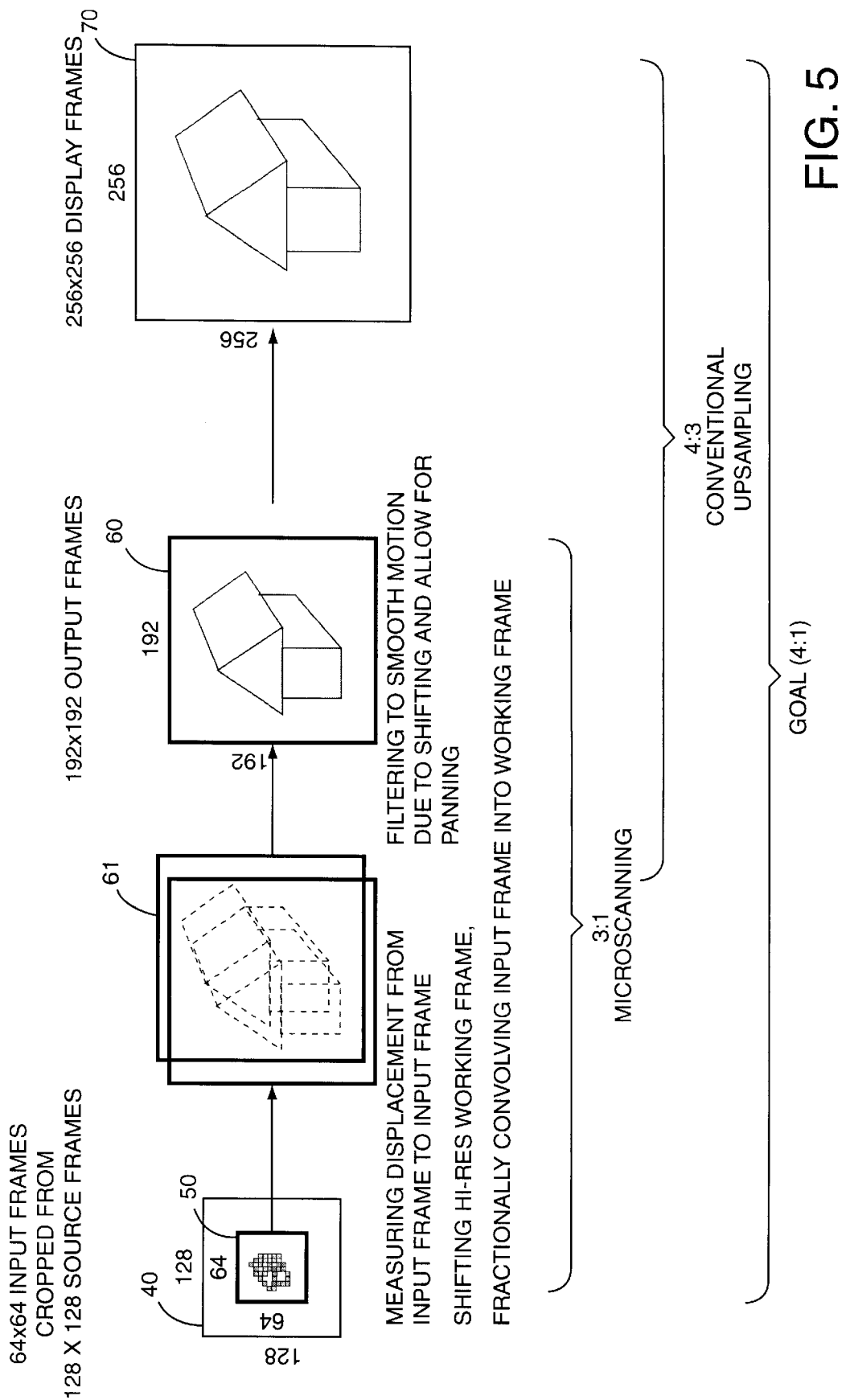
FIG. 5 is a fanciful diagram showing how the preferred system 20 adds detail to form higher resolution frames and how the 3:1 pixel gain of FIG. 4 may be combined with cropping to achieved a different size input frame (e.g. 64×64) and conventional resampling to provide a different pixel gain (e.g. 4:1)

FIG. 5 is a first conceptual diagram of the preferred embodiment 20 in operation. It shows how the 64×64 input frames 50 are cropped from the 128×128 source frames 40 of FIG. 3, "microscanned" at a 3:1 ratio as shown in FIG. 4; and then upsampled at a 4:3 ratio to achieve the total desired pixel gain of 4:1. The cropping and resampling operations correspond to the optional "front" and "back" ends 21, 22 of the generalized system 20 of FIG. 1.

The preferred system 20 "microscans" the input frames 50 into output frames 60 by moving around and convolving new image data into a single working frame 61. The working frame 61, however, may be conceptually decomposed into a new working frame 61*a* corresponding to a convolution-expanded fractionally-shifted version of each new input frame 50, a historic working frame 61*b* that is moveable into alignment with the new working frame 61*a*, and a combined working frame 61*c* that is formed by combining the image details from the new working frame 61*a* with the image details contained in the historic working frame 61*b*.

FIG. 6

Figure 6A:
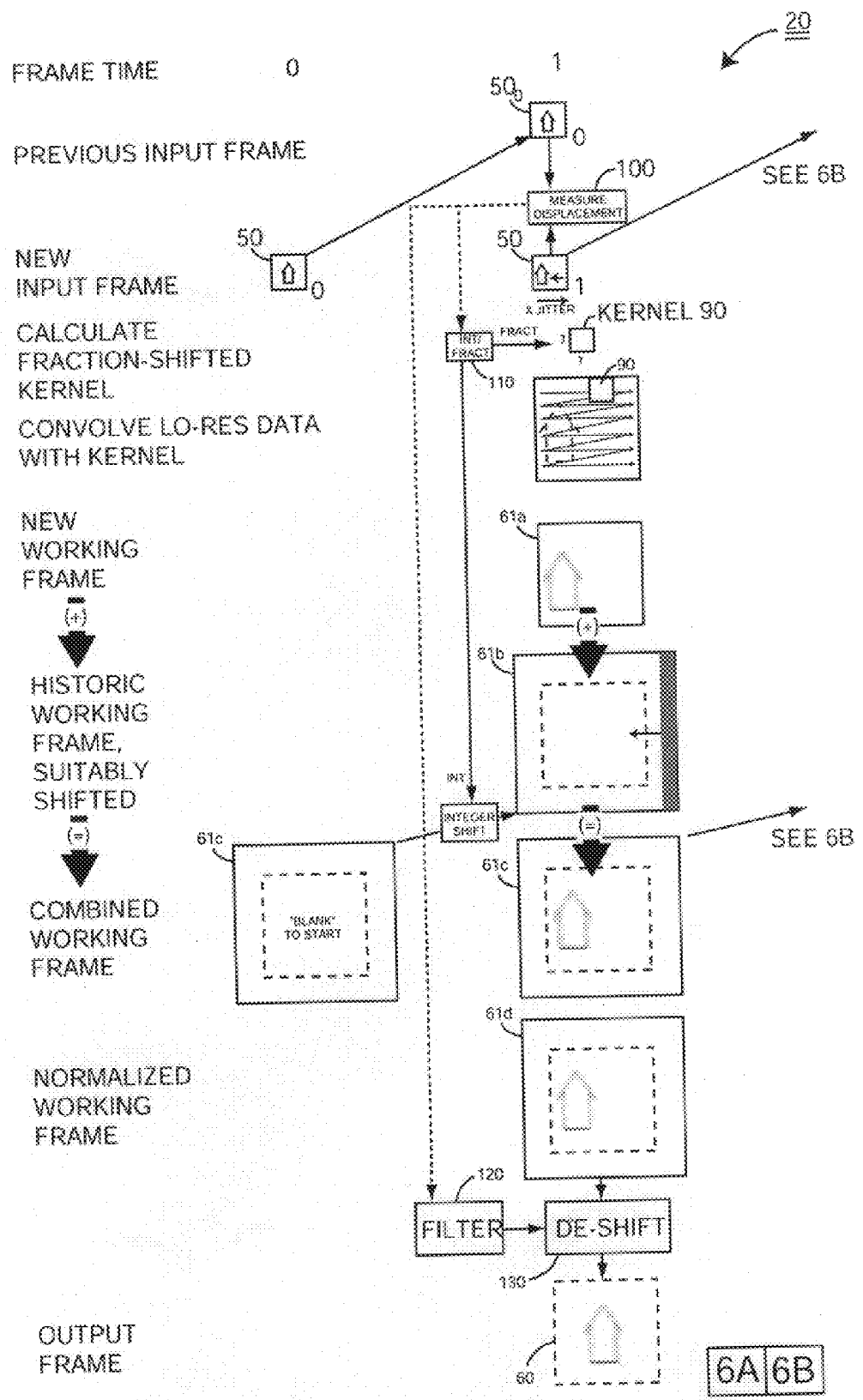
FIG. 6 (divided across FIGS. 6A and 6B) is a conceptual block diagram that shows the abstract operation of this embodiment from a frame to frame point of view.
Figure 6B:
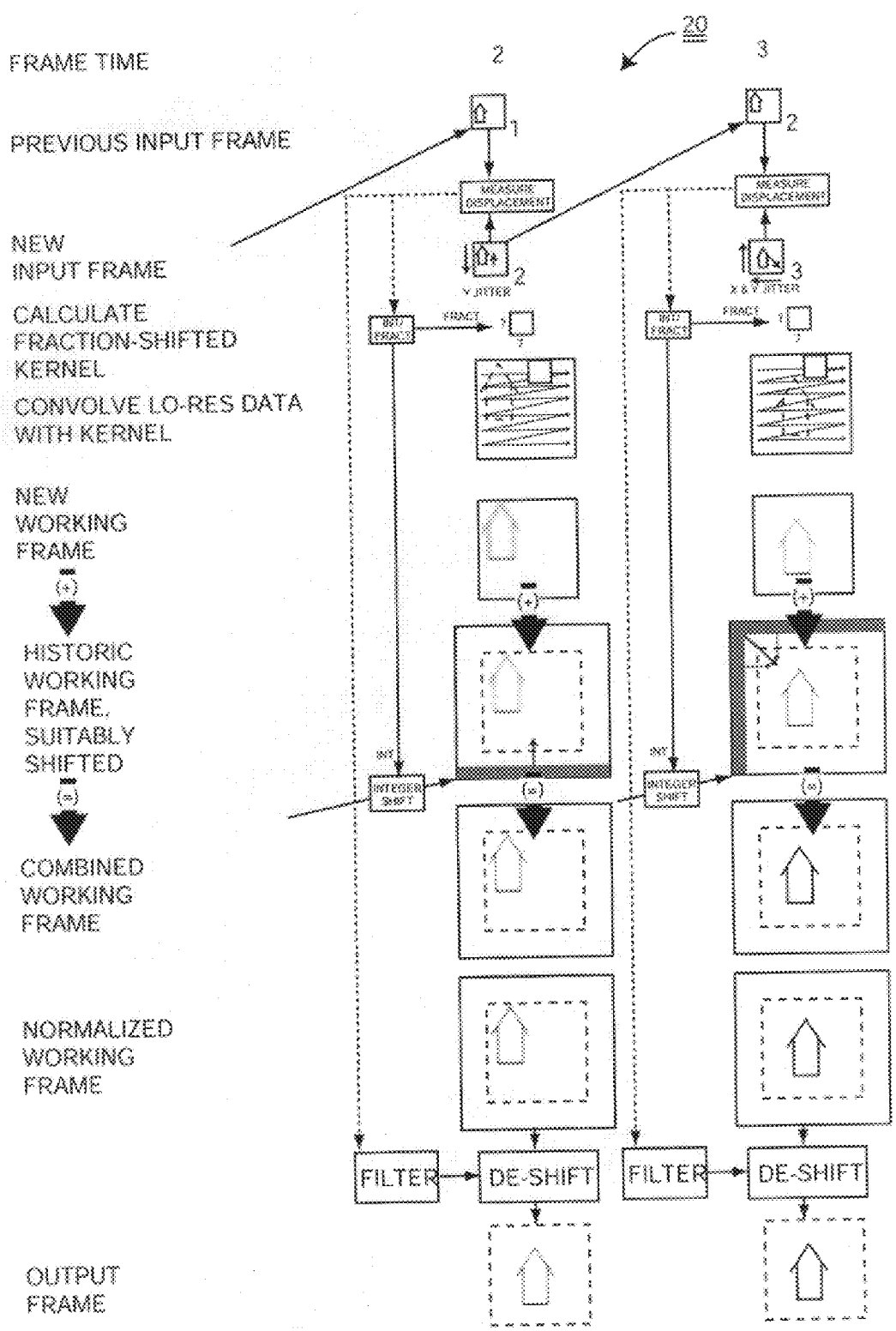

FIG. 6 is a second conceptual block diagram that shows the abstract operation of this embodiment in even more detail. Here, the system 20 processes several hypothetical input frames 50 containing a jittery image of a simple house. The processing occurs over several frame times 0, 1, 2, 3, and so on, and proceeds from top to bottom and left to right.

Frame Time 0

During frame time 0, the system receives an initial input frame #0 and stores it as a New Input Frame 50. For simplicity, the house is centered in this initial input frame #0. At this point, a combined working frame 61*c* used to aggregate the ensuing image data is blank.

Frame Time 1

At the beginning of frame time 1, input frame #0 is stored as a previous input frame 500 and input frame #1 is received and stored as a new input frame 50. In FIG. 6, input frame #1 has jittered to the right relative to input frame #0 such that the house has moved to the left. In this case, the jitter is in the "x" direction only.

With these two input frames 50 and $50_0$ now in hand, a measurement block 100 measures the displacement between them and a separator block 110 converts the measured displacement into an integer shift component INT and a fraction shift component FRACT. The system 20 uses the integer and fractional shift components to accurately register the new working frame 61*a* with the historic working frame 61*b*. The system 20 may specify the integer shift component INT in units of low resolution pixels (LoRes units), but preferably uses high resolution units (HiRes units) in order to provide a closer, more accurate integer alignment that, on average, reduces the remaining amount of displacement that must be represented by the fractional shift component FRACT.

The integer shift component INT is provided to a shift block 140. As suggested by the arrow passing through the shift block 140, the system 20 moves the combined working frame 61*c* from the previous frame time (blank in this case), in whole pixel increments, to establish a historic working frame 61*b* in an suitable position for use with the current frame time. In essence, the shift block 140 positions the historic working frame 61b "under" the new working frame 61a. Here, in frame time 1, the historic working frame 61b is moved to the left, as shown by the arrow, to "catch" the image data from the new working frame 61a in an appropriate location. The gray area represents an area that was covered by the combined working frame 61c from the previous frame time.

The system 20 uses the fractional shift component FRACT to mathematically shift a convolution kernel 90 (see e.g. FIGS. 9–11) and then expands the new input frame 50 into a new working frame 61a through convolution. Due to the linear properties of convolution, the new working frame 61a is shifted by that same fractional amount as the kernel 90 used for convolution.

With the new working frame 61a now accurately registered with the historic working frame 61b, as suggested by the large arrows with the embedded (+) and (=) signs, the system 20 merges them together to form a combined working frame 61c. Here, in frame time 1, the image of the house begin to appear.

Next, at least in this embodiment, the image data from the combined working frame 61c is normalized to form a normalized working frame 61d. The normalization process removes any local intensity variations that were inadvertently processed into the combined working frame 61c.

Finally, a tracking and smoothing filter 120 that also receives the displacement information from the measurement block 100, determines a suitable "de-shift" value for controlling a "de-shift" block that produces a stabilized output frame 60. The filter 120 allows the output frame 60 to smoothly follow panning motion, but removes the higher frequency jitter. Note that in the output frame 60, the house has been moved back toward where it began in Frame #0.

Frame Time 2

At the beginning of frame time 2, input frame #1 is stored as a previous input frame 500 and input frame #2 is received and stored as a new input frame 50. In FIG. 6, input frame #2 has jittered down relative to input frame #1 such that the house has moved up within the frame. Here, therefore, we have experienced jitter in the "y" direction only. As before, the measurement block 100 measures the displacement between the two input frames 50 and $50_0$ and a separation block 110 converts the measured displacement into an integer portion INT and a fraction portion FRACT.

Proceeding further downward in frame time 2, the system 20 uses the fractional portion FRACT to mathematically shift the convolution kernel 90 and then convolves the new input frame 50 into a new working frame 61a that is moved by that same fractional amount. The system 20 then moves the combined working frame 61c from the previous frame 1 into the historic working frame 61b through the shift block 140 (receiving the integer portion INT) to shift the historic working frame 61b "under" the new working frame 61a in integer pixel increments. Here, in frame time 2, the historic working frame 61b is moved upward, as shown by the vertical arrow, to "catch" the image data from the new working frame 61a in an appropriate location. As before, the combination of these two alignment operations (INT & FRACT) results in an accurate, sub-pixel registration between the new working frame 61a and the historic working frame 61b.

Next, the image data in the combined working frame 61c is normalized to form a normalized working frame 61d.

Finally, the tracking and smoothing filter 120 and associated "de-shift" block 130 move the normalized working frame 61 d to create a stabilized output frame 60. Again, note that the house has been moved back toward where it was in Frame #1.

Frame Time 3

At the beginning of frame time 3, input frame #2 is stored as a previous input frame $50_0$ and input frame #3 is received and stored as a new input frame 50. In FIG. 6, input frame #3 has jittered diagonally relative to input frame #2, i.e. in the "x" direction and in the "y" direction. As before, the measurement block 100 measures the displacement between the two input frames 50 and $50_0$ and a separation block 110 converts the measured displacement into an integer portion INT and a fraction portion FRACT.

Proceeding further downward in frame time 3, the system 20 uses the fractional portion FRACT to mathematically shift the convolution kernel 90 and then convolves the new input frame 50 into a new working frame 61a that is moved by that same fractional amount. The system 20 then moves the combined working frame 61c from the previous frame 2 into the historic working frame 61b through a shift block 140 that receives the integer portion INT and then shifts the historic working frame 61b "under" the new working frame 61a in integer pixel increments. Here, in frame time 3, the historic working frame 61b is moved downward and to the right, as shown by the diagonal arrow, to "catch" the image data from the new working frame 61a in an appropriate location. As before, the combination of these two alignment operations (INT & FRACT) results in an accurate, sub-pixel registration between the new working frame 61a and the historic working frame 61b.

Next, the image data in the combined working frame 61c is normalized to form a normalized working frame 61d.

Finally, the tracking and smoothing filter 120 and associated "de-shift" block 130 move the normalized working frame 61d to create a stabilized output frame 60. As in previous frames, the house has been moved back toward where the filter expects it to be in the absence of jitter.

Processing continues from frame to frame in this manner so long as new input frames 50 are available and the system 20 is controlled to process such frames.

FIG. 7

Figure 7:
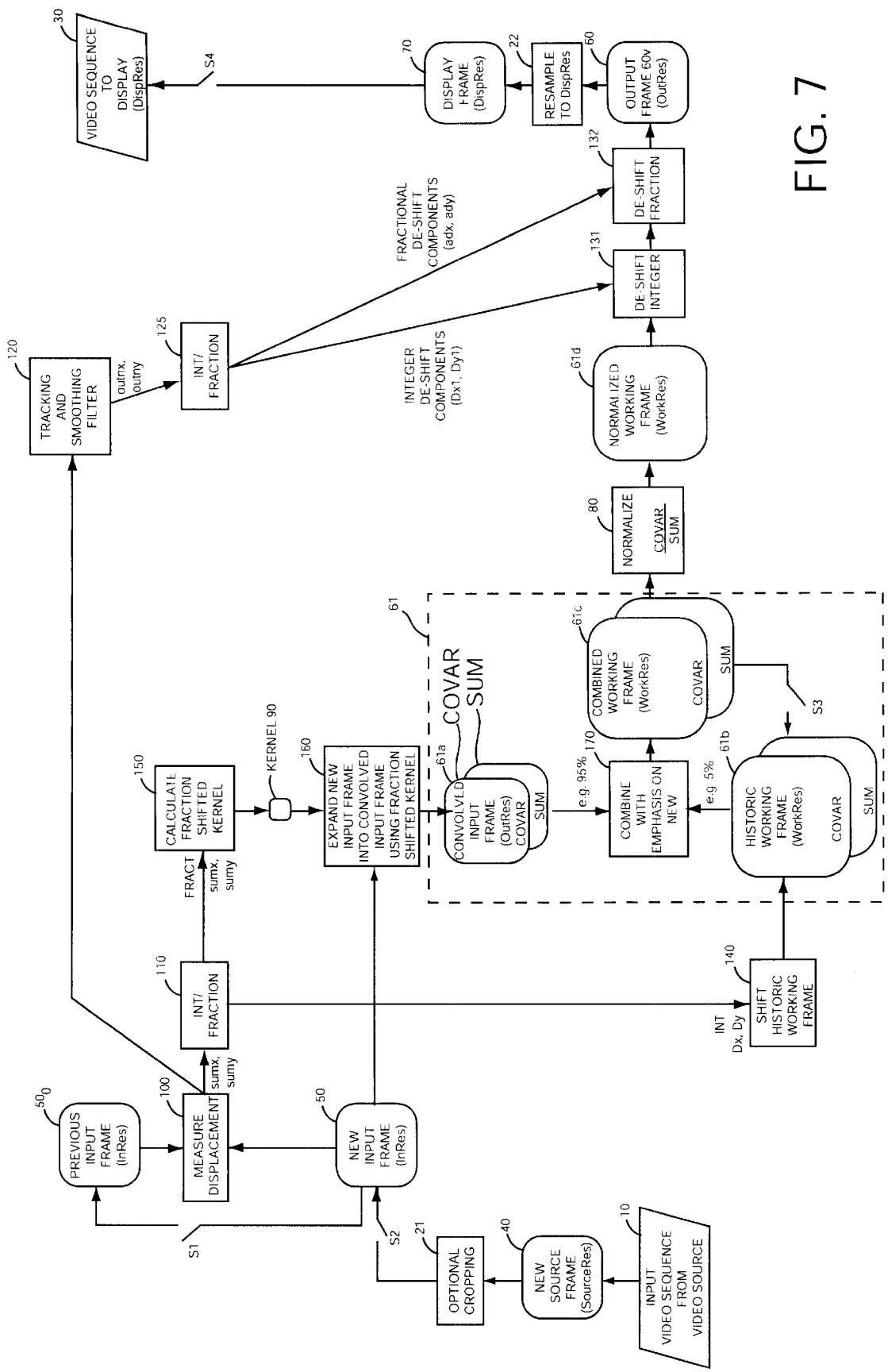
FIG. 7 is a temporal block diagram showing the movement of frames and calculations made within a single frame time of image processing according to a presently preferred embodiment of this invention.

FIG. 7 is a fanciful depiction of a single iteration or frame time corresponding to one column in FIG. 6. The emphasis here is on the connectivity between the functional blocks that operate on the frames and the timing of such operations as represented by "switches" that move the frames from block to block at the appropriate time.

The Number of Working Frames

FIG. 7 presents three working frames 61a, 61b, and 61c for the sake of clarity and a particular embodiment may well use discrete working frame as shown. The preferred embodiment, however, uses only one "integrated" working frame 61 as suggested by the dashed line 61 surrounding the three working frames 61a, 61b, and 61c. As will become clearer below with reference to FIG. 8 and the attached source code, the preferred embodiment simply shifts the Working Frame 61 as required and then convolves the image data from the New Input Frame 50 directly into the Working Frame 61.

The Multi-Array Representation of the Working Frame(s)

The preferred working frame 61 is represented with two component arrays called "covar" and "sum" as suggested by the overlayed blocks making up the illustrated working frames 61a, 61b, and 61c. The covar array contains the sum of the weighted intensities accumulated into each HiRes pixel during the convolution and combining processes. The sum array contains the sum of the weights applied to such intensities during the convolution and combining processes for use during a subsequent normalization process. The covar and sum arrays, therefore, allow for convenient combination and ultimate normalization of the image data. The covar and sum arrays are representative of this embodiment, however, and may be eliminated in other embodiments.

Switch Closures (Frame Iteration)

Switches S1 through S4 represent frame transfers that occur during each new frame. Each switch should be thought of as closing momentarily, once per frame to transfer data.

At S1, the system 20 prepares for a new input frame by transferring the most recent image data from New Input Frame 50 to Previous Input Frame $50_0$.

At S2, the system receives the new image data and loads it into New Input Frame 50. The new image data is contained in source frames 50 that come from a video source 10. The source frames 40 may be cropped to different sized input frames by a cropping block 21.

At S3, the system 20 transfer the Combined Working Frame 61c from the previous frame time to the Historic Working Frame 61b used in the current frame time.

At S4, the system 20 transfers the completed display frame 70 to the display device 30.

The first three transfers represented by S1, S2, and S3 occur at the start of a frame time. The display transfer represented by S4, however, may occur at the start of a frame time or at the end of a frame time (as it does in the attached source code)

Post-Switch Processing

The remainder of the processing occurs after the momentary "closing" and reopening of switches S1, S2 and S3. In particular, the measurement block 100 determines the displacement between the New Input Frame 50 and the Previous Input Frame $50_0$ and output such information to the separator block 110 and to the filter block 120.

The separator block 110, as was described above with reference to FIG. 6, divides the displacement information into an integer shift component INT and a fractional shift component FRACT.

The integer shift component INT is passed to a shift block 140 that shifts the Historic Working Frame 61b into pixel-bounded alignment with the New working Frame 61a that will be generated from the New Input Frame 50.

The fractional shift component FRACT is passed to a kernel calculation block 150 that uses it, in conjunction with a mathematical definition of the kernel, to derive the forty-nine discrete weights of a "fractionally-shifted" 7×7 kernel 90. The fractionally-shifted kernel 90 is then passed to a convolution block 160 that uses the kernel 90 to expand the New Input Frame 50 into a New Working Frame 61a.

The New Working Frame 61a and Historic Working Frame 61b are now in registration.

Next, a combining block 170 merges the New Working Frame 61a into the Historic Working Frame 61b to form a Combined Working Frame 61c. The preferred combining block 170 use an exponential filter that emphasizes the historic image data and de-weights the new data so that the new data does not too rapidly modify the Output Frame 60. The actual implementation is a bit different, but this process may be regarded as keeping 93.75% of the historic data and adding 6.25% of the new data. This historically-weighted approach forces the system to slowly absorb new image data and gracefully transition over to a completely new image if one is presented.

A normalization block 180 processes the Combined Working Frame 61c to produce a Normalized Working Frame 61d. The preferred normalization block 180 produces the Normalized Working Frame 61d by simply dividing each element in the covar array by the corresponding element in the sum array.

A filter block 120 controls de-shift blocks 130 to transform the Normalized Working Frame 61d into a stabilized Output Frame 60.

The Output Frame 60 is then passed on as a Display Frame 70. The output frame 60 may be passed "as is" or it may be modified in terms of resolution, but not quality, by an optional resampling block 180.

At this point, at the end of the frame time, switch S4 may be closed to write the display frame 70 to the display device 30.

FIG. 8

Figure 8B:
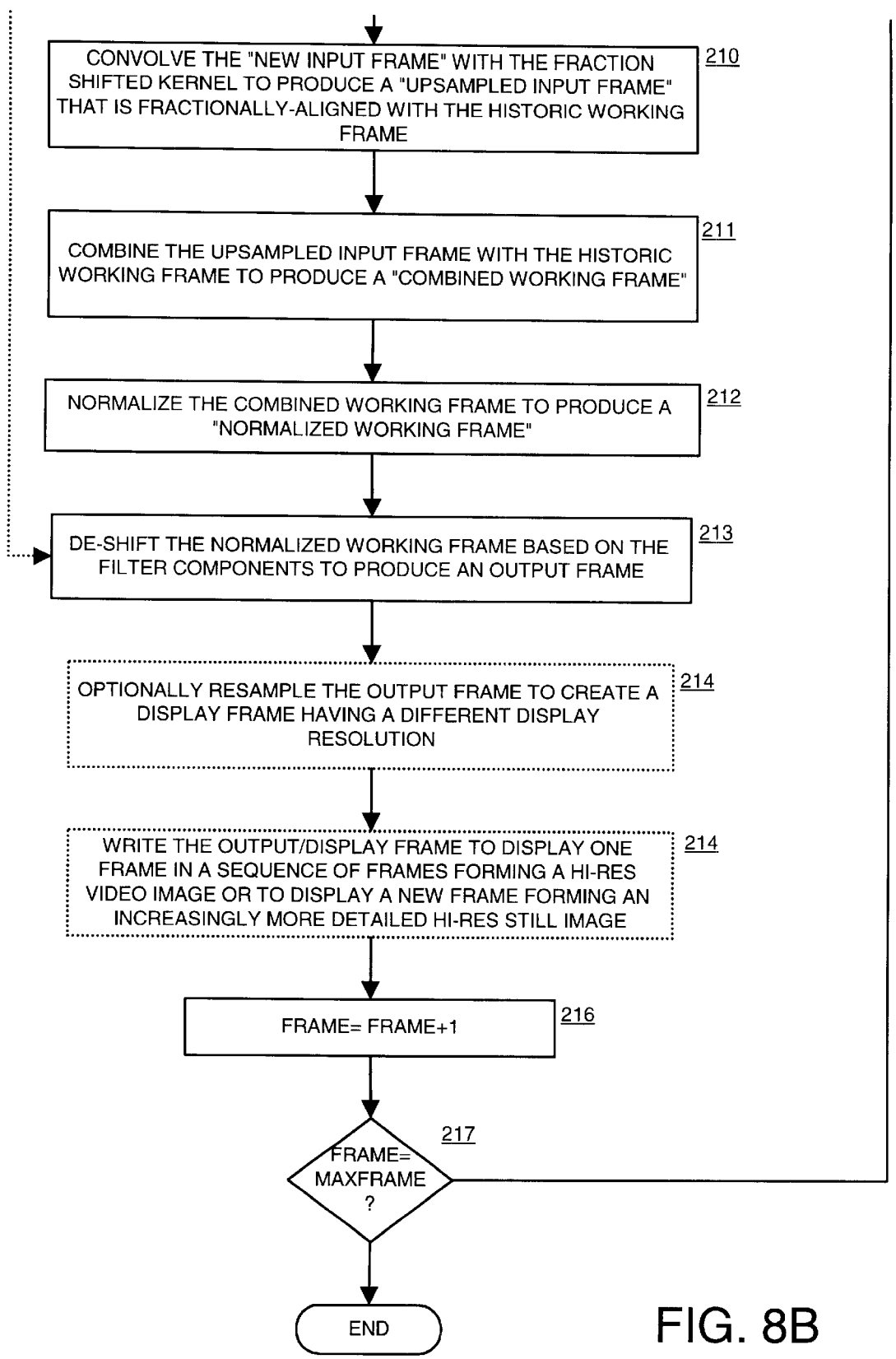
FIG. 8 (divided across FIGS. 8A and 8B) is a linear flow chart of the FIG. 7 process that correlates with the attached source code.

FIG. 8 is a flow chart that corresponds to FIG. 7 and the attached source code that runs on a general purpose computer.

The System's Data Structures

The code relies on these main data structures:

1. A Video Source 10.—a supply of jittery, low resolution source frames 40. In the preferred embodiment, the video source 10 is a computer file that contains a series source frames 40 at a resolution of 128×128 (SourceRes).

2. Input Frame Storage—storage for two low-resolution input frames 50 at a native input resolution of 64×64 (InRes). The code stores the New Input Frame 50 in a memory-addressed array referenced by a pointer called p and stores each Previous Input Frame $50_0$ in a memory-addressed array referenced by a pointer called p0.

3. Working Frame Storage—storage for one working frame 61 at a working resolution of 192+100×192+100 (WorkRes). The Output Frame 60 will be generated at a resolution of 192×192 (OutRes). The exact number is not important, but the use of extra pixels (e.g. 100) in each pixel dimension of the Working Frame 61 allows the system 20 to repeatedly shift the Working frame 61 around under the new image data, in response to measured jitter, and to accommodate some degree of panning, without running out of data at the edges. This can be best understood by looking back to the shifting of the Historic Working Frame 61b in FIG. 6.

The system 20 operates on the working frame 61 using a covar array and a sum array as first discussed above with reference to FIG. 7 and as will be discussed further below. For processing efficiency, the code stores the covar and sum arrays in an interleaved fashion within one common memory-addressed array of dimension 584×584. The code uses a 292×292 array variable called pix[m][n] to hold an array of base addresses that are assignable to independent pointer variables called pix_point and pix_point_1. The pointers are used to read, write, and shift around (from one to the other) the values in the interleaved array that hold the covar and sum values that represent the working frame 61.

4. Output Frame Storage—storage for one output frame 60 at an output resolution of 192×192 (OutRes). The code stores the Output Frame 60 in a memory-addressed array referenced by a pointer called phires. In order to derive the pixels of the Output Frame 60 from a desired subset of the larger Working Frame 61, as directed by the filter block 120, the code uses a 292×292 array variable called Hi_res_est [m][n] to hold an array of addresses that are programatically assigned to phires for referencing each particular memory location holding an element of the Output Frame 60.

5. Kernel Storage—storage for kernel coefficients and storage for a kernel 90 that is calculated on the basis of those coefficients and the fractional portion FRACT of the measured displacement. Although kernels of various size and shape may be used, the preferred kernel 90 is a 7×7 array defined by an envelope that is continuously represented as a fifth order polynomial. The code stores the kernel coefficients as constants a1, a2, a3, a4, and a5 (although a1 is not used in this embodiment) and stores the 7×7 kernel 90 (that is re-calculated each new frame time on the basis of the fractional shift component FRACT) in an array variable called kern[m][n]. The kernel, of course, could be stored and accessed in various other manners. For example, the kernel could be stored within a table in a higher resolution form and elements selected therefrom based on a relative index.

6. Display Frame Storage—storage for a display frame 70 at a display resolution of 256×256 (DispRes). The code stores the display frame 70 as a one-dimensional memory-addressed array referenced by a pointer called pint. The code uses an array variable called Hi__res__int[m] to hold an array of addresses that are programatically assigned to the pointer pint for referencing each particular memory location holding an element of the Display Frame 70.

The System's Operation

As revealed by FIGS. 7 and 8 and the attached source code, the system 20 operates as follows:

At Step 201, the system 20 initializes a number of variables, pointers, and memory arrays that are used during processing. The program begins by performing a series of initialization routines which are well known to individuals experienced in the art of computer programming. Variables are dimensioned and memory space is allocated for them. Libraries are linked. Files are opened for reading and writing as required by the application.

At Step 202, as suggested by the connection of the video source 10 to New Input Frame 50, the system 20 reads in frame 0 and stores its pixel values in a memory-addressed array called "New Input Frame" As already noted, the video source 10 is this embodiment is digital data from a disk file, but the digital data could come directly from an image sensor 15 like that shown in FIG. 1.

At Step 203, as suggested by the connection of New Input Frame 50 to Previous Input Frame $50_0$ via switch S1, the system 20 copies the contents of New Input Frame 50 into another memory-addressed array called Previous Input Frame $50_0$ to temporarily retain that value for use as a reference frame in measuring displacement relative to the next New Input Frame 50. At this point in the initial pass, therefore, the image data of frame 0 is stored in Previous Input Frame $50_0$.

At step 204, as suggested by the connection of the video source 10 to the New Input Frame 50 via switch S2, the system 20 reads the next low-resolution frame into New Input Frame 50. At this point in the initial pass, therefore, the image data of frame 1 is stored in New Input Frame 50.

Measuring Displacement

At step 205, as suggested by the measurement block 100, the system 20 rapidly measures the displacement between the New Input Frame 50 and the Previous Input Frame $50_0$ due to random platform jitter and panning. In this embodiment, displacement is characterized only in terms of X,Y displacement, but other more complicated forms of motion may be considered.

The preferred method of measuring displacement between successive pairs of input frames 50, $50_0$ provides the estimates in one shot without requiring any trial and error iteration. This is accomplished with an image gradient method. The ultimate result of the image gradient method is a "shift" vector or S-vector with only two components: an x component called shiftx that defines movement along the X-axis and a y component called shifty that defines movement along the Y-axis. The formula that defines the S-vector is:

$$S = M^{-1}V \quad (1)$$

Where $$S = \begin{vmatrix} shiftx \\ shifty \end{vmatrix} \quad V = \begin{vmatrix} \sum_{n=1}^{N} (I_K - I_0)G_{x_n} \\ \sum_{n=1}^{N} (I_K - I_0)G_{y_n} \end{vmatrix}$$

$$M = \begin{vmatrix} \sum_{n=1}^{N} G_{x_n}^2 & \sum_{n=1}^{N} G_{x_n}G_{y_n} \\ \sum_{n=1}^{N} G_{x_n}G_{y_n} & \sum_{n=1}^{N} G_{y_n}^2 \end{vmatrix}$$

$M^{-1}$ is an inverse matrix of a second order.
n=the pixels of interest.
N=total number of pixels.
$I_0$=Intensity of an individual pixel in the Previous Input Frame $50_0$ (reference frame)
$I_k$=Intensity of an individual pixel in the New Input Frame 50 (frame of interest).
$G_{x_k}$=gradient in the x direction through a particular pixel k.
$G_{y_k}$=gradient in the y direction through a particular pixel k.

There are several possible gradient forms. The following equations, for example, are one possible representation of the gradients $G_{x_k}$ and $G_{y_k}$ where the intensities of the contributing pixels may range from −1 to +1:

$$G_{x_k} = (1/2)(I_{x_k+1,y_k} - I_{x_k-1,y_k})$$
$$G_{y_k} = (1/2)(I_{x_k,y_k+1} - I_{x_k,y_k-1}) \quad (2)$$

The gradients according to (2) are known as the difference gradients because they rely on the direct difference between the two neighboring pixels, one on either side, along the direction of interest. The difference gradients of (2) are very efficient in processing some motions, but not others. In particular, the motion of an image point at exactly 45 degrees to the system of coordinates (shiftx=shifty) will produce a zero-valued motion vector. In essence, the difference gradients are "blind" to motion along the 45 degree line.

The preferred gradient form for this embodiment is sensitive to 2-dimensional motion in all directions without any "blind spots." One such gradient form is the Prewitt Gradient which uses six neighboring pixels, three to one side and three to the other, as follows:

$$G_{x_k} = (1/6)(I_{x_k+1,y_k+1} - I_{x_k-1,y_k+1} + I_{x_k+1,y_k} - I_{x_k-1,y_k} + I_{x_k+1,y_k-1} - I_{x_k-1,y_k-1})$$
$$G_{y_k} = (1/6)(I_{x_k+1,y_k+1} - I_{x_k+1,y_k-1} + I_{x_k,y_k+1} - I_{x_k,y_k-1} + I_{x_k-1,y_k+1} - I_{x_k-1,y_k-1}) \quad (3)$$

The directional versatility of the Prewitt Gradient comes at a cost. In particular, since the Prewitt Gradient uses three times as many pixels to estimate the displacement, it requires about three times as much processing power as compared with the difference gradient.

The attached code uses the Prewitt Gradients of equation (3) in the matrix operation of equation (1) to compute shiftx and shifty, the x and y components of the S-vector that describe the positional displacement between the New Input Frame 50 and the Previous Input Frame $50_0$. More specifically, the attached code proceeds as follows in the section entitled "Register New Frame Against Previous One Using Gradient Method":

First, the code defines these "frame-wide" quantities and sets them equal to zero sum_grx_sqr sum_gry_sqr sum_cross sum_vecx sum_vecy Referring back to equation (1), it can be seen that the code will use these values to calculate the S-vector as follows:

$$S = M^{-1}V \quad (4)$$

Where $$S = \begin{vmatrix} shiftx \\ shifty \end{vmatrix} \quad V = \begin{vmatrix} \text{sum\_vec\_x} \\ \text{sum\_vec\_y} \end{vmatrix} \quad M = \begin{vmatrix} \text{sum\_grx\_sqr} & \text{sum\_cross} \\ \text{sum\_cross} & \text{sum\_gry\_sqr} \end{vmatrix}$$

Next, the code performs the following operations on each pixel of the New Input Frame 50:

1) calculates the x and y components gradx and grady of the spatial gradient associated with each pixel under consideration using the Prewitt method and accumulates such values into the frame-wide variables, i.e.:

sum_grx_sqr=sum_grx_sqr+gradx*gradx sum_gry_sqr=sum_gry_sqr+grady*grady sum_cross=sum_cross+gradx*grady 2) calculates the temporal or frame-to-frame difference diff between the pixel under consideration in the New Input Frame 50 and the identical pixel in the Previous Input Frame 50$_0$ and accumulates it into the frame-wide variables, i.e.:

sum_vecx=diff*gradx+sum_vecx sum_vecy=diff*grady+sum_vecy

Next, after having processed all N of the pixels in the New Input Frame 50, the code calculates the shiftx and shifty components of the S-vector using equation (4). Shiftx and shifty are in units of InRes pixels.

Finally, based on the 3:1 ratio between OutRes and InRes, the code converts shiftx and shifty into in units of OutRes pixels and stores the resulting values in sumx and sumy, as follows:

sumx=3*shiftx sumy=3*shifty (5)

Sumx and sumy now contain real number values representing the X and Y displacement between the New Working Frame 50 and the Previous Input Frame 50$_0$.

Dividing the Displacement Into Components

At step 206, as suggested by the separator block 110, the system 20 divides the X,Y components sumx, sumy of the estimated displacement into two portions for later use: (1) an integer portion and (2) a fractional portion. The code refers to the integer portions as Dx and Dy and the fractional portions by the same name as the original values, i.e. sumx and sumy. The pseudocode operations are as follows:

Dx=INT(sumx)

Dy=INT(sumy)

sumx=sumx−Dx sumy=sumy−Dy

Where:

INT( ) is the computer operation which finds the largest integer within a number;

Dx and Dy are the largest integer in sumx and sumy (in working resolution); and

Sumx and sumy are left with the fractional remainders in the shifts (at working resolution)

Dx, Dy and sumx, sumy are the integer and fractional shift components, respectively, used to shift the Working Frame 61 into registration with the New Input Frame 50. This shift takes place in two operations below, the first is a shift to the nearest WorkRes pixel using the integer shift components Dx, Dy, and the second is accomplished by a fractional workres pixel shift in the convolution kernel 90 using the fractional shift components sumx, sumy.

Calculating Filter Values

At step 207, as suggested by the filter block 120 and the associated separator block 125, the system 20 also uses the X,Y components sumx, sumy of the estimated displacement to update the filter components that ultimately stabilize the Output Frame 60 in step 213 below. In particular, the tracking filter 120 takes the frame-to-frame motion of the input video sequence and calculates a positional trajectory which tracks slow panning motion, but attenuates higher frequency jitter motion. It takes as its inputs sumx and sumy and produces tracking shifts outnx and outny which define the distance the Normalized Working Frame 61$d$ should be moved or "de-shifted" to coincide with the desired trajectory. Outnx and Outny, like sumx and sumy, are in units of WorkRes pixels.

In the preferred embodiment, the tracking filter 120 is a Type 2 tracking loop familiar to those experienced in the art of control system design. Such a loop tracks constant velocity motion without error and attenuates high frequency jitter by a factor proportional to the square of the jitter frequency.

After the Tracking and Smoothing Filter block 120 calculates the x and y tracking shift components outnx, outny of the displacement between the current position of the Normalized Working Frame 61$d$ and the desired position of the Output Frame 60, the separator block 125 separates each component into its integer and fractional part. In the code, the operations are as follows:

Dx1=INT(outnx)

Dy1=INT(outny)

adx=outnx−Dx1 ady=outny−Dy1

Where:

INT( ) is the computer operation which finds the largest integer within a number Dx1 and Dy1 (like the Dx and Dy variables output by the separator block 110) are the largest integers in the tracking shift components outnx and outny (in WorkRes units)

adx and ady (like the sumx and sumy variables output by the separator block 110) are the fractional remainders in the tracking shift components (in WorkRes units).

The system 20 uses the foregoing values to shift the Working Frame 61 to the desired output frame position. This shift takes place below in two operations, the first is a whole pixel shift using Dx1 and Dy1, and the second is a fractional pixel shift using adx and ady. FIG. 7 shows integer and fractional "de-shift" blocks 131, 132. In the code, however, the fractional shift is carried out in connection with the bilateral interpolation performed by the resampling block 180.

Shifting the Working Frame in Whole Pixel Increments

At step 208, as suggested by the shift block 140, the system 20 shifts the historic working frame 61*b* into alignment with the New Input Frame 61*a* based on the integer shift components Dx, Dy of the measured displacement between the New Input Frame 50 and the Previous Input Frame 50$_0$. The alignment may be regarded as a "rough integer alignment" in that the historic working frame 61*b* is only shifted by integer or whole pixel amounts, such that some fractional offset may still remain. As suggested by FIG. 6, the historic working frame 61*b* is initially empty (as is the single working frame 61 implemented in the preferred code). The system 20, therefore, initially shifts an empty working frame 61 into rough integer alignment with the New Input Frame 50 (e.g. frame 1).

The combined working frame 61*c* from the previous frame time was registered to the previous input frame 50$_0$. The shift block 140 shifts the historic working frame 61*b*, loaded with image data from the combined working frame 61*c*, within a whole HiRes pixel of the New Input Frame 50. The attached code perform this shift by index reassignment. That is, the indices or pointers used to address a workres pixel within the historic working frame 61*b* are incremented by the integer numbers Dx and Dy.

Calculating the Fractionally-Shifted Kernel

At step 209, as suggested by the kernel calculation block 150 and the kernel 90 that it produces, the system 20 calculates a fraction shifted kernel 90 for this particular frame time based on the fractional shift components sumx, sumy of the estimated displacement between the New Input Frame 50 and the Previous Input Frames 50$_0$. The New Input Frame 50 will be convolved with the kernel 90 to create a WorkRes version of the input frame. This operation is sometimes called "upsampling" in the art.

FIG. 9 shows a three-dimensional representation of the preferred kernel 90. As shown, the preferred kernel 90 includes a 7×7 array of kernel elements or weights. The inventors initially considered an 11×11 kernel, but ultimately settled on the 7×7 kernel shown in order to speed up the computation. It was empirically determined that this reduction in kernel size did not produce any artifacts in the subject imagery, but kernels of different size or shape may be necessary for other image sources or to achieve certain image processing functions.

The kernel 90 of FIG. 9 is unshifted in that each of its kernel elements was calculated from a fifth order polynomial based on the unmodified radial distance from the center of the kernel to the center of each kernel element. The polynomial constants are set in the initialization routine.

It is well known that the image frame resulting from a convolution will be shifted by any amount the convolution kernel is shifted. It is desirable to shift the upsampled image by the fractional amount equal to the fractional shift components sumx and sumy in order to complete the registration between the upsampled input frame 61*a* and the historic working frame 61*b* which was previously shifted by whole pixel increments. For these reasons, the kernel 90 is offset by sumx and sumy in x and y respectively. This is accomplished by subtracting sumx and sumy from the internal kernel distance used to compute the radial distance to a kernel element.

To allow for such shifting, the preferred kernel 90 is continuously defined by a mathematical equation that may be mathematically shifted in the X or Y direction by the fractional shift components sumx, sumy of the estimated displacement. As noted above, however, the kernel could be defined and provided in other ways such as a high resolution table and index offset values.

In particular, the code performs the fractional shift by modifying the radial distance "4" to each kernel element, K(l,m), based on the fractional shift components sumx, sumy.

The formula for the radial distance, r(l, m) out to any kernel element is:

$$r(l,m) = \text{sqrt}((l-\text{sumy})^2 + (k-\text{sumx})^2) * 1.33333$$

And the formula for each kernel element, K(l,m), associated with such radial distance r(l, m) is:

$$K(l,m) = a0 + a1*[r(l,m)] + a2*[r(l,m)]^2 + a3*[r(l,m)]^3 + a4*[r(l,m)]^4 + a5*[r(l,m)]^5$$

Where:

l,m = kernel indices that are incremented through the closed interval, −3 to +3;

sumx and sumy = the fractional shift components determined in steps 205 and 206 above;

a0 through a5 are constants defined in the initialization section; and 1.3333 is an artifact of this embodiment having been initially designed to implement a 3:1 pixel gain rather than a 4:1 pixel gain, 4 divided by 3 equaling 1.3333.

As shown by the following pseudo-code based on the attached source code, this embodiment develops a new fractionally-shifted kernel 90 for each New Input Frame 50 based on the fractional shift components sumx, sumy of the estimated displacement between the New Input Frame 50 and the Previous Input Frame 50$_0$. In particular, the code "fractionally-shifts" each of forty-nine radius values by the fractional shift components ("sumx" and "sumy") before solving the kernel function with such shifted radius value (note that the outer loop variable is a lowercase "L" and not a "1"), as follows:

```
//******* Kernel calculation ********
//*********************************
for (l=-3; l<=3; l++)
{
    for (k=-3; k<=3; k++)
    {
        r= (sqrt (abs (l-sumy) ^2 + abs (k-sumx) ^2) *1.3333;
        kern [l+3] [k+3] = a0 + a2*r^2 + a3*r^3 + a4* r^4 + a5*r^5;
    }
}
```

Ultimately, therefore, forty-nine discrete kernel values are calculated for forty-nine modified radius values, and those values are placed in an array that defines the fractionally-shifted 7×7 kernel 90.

FIGS. 10 and 11 show the kernel 90 in "fractionally-shifted" form for sumx=0.0 and sumy=0.5 and for sumx=0.5 and sumy=0.0, respectively.

With the kernel 90 now in hand, convolution is possible.

Convolving with the Fraction-Shifted Kernel

At step 210, as suggested by the convolution block 160 and by FIG. 12, the system 20 uses the "fraction-shifted" kernel 90 produced in step 209 to expand the New Input Frame 50 into a New Working Frame 61*a*.

The system "expands" or "resamples" the New Input Frame 50 into the New Working Frame 61*a* through the process of convolution. In step 209 above, however, the kernel 90 to be used for this convolution was fractionally-shifted from its nominal position based on the fractional shift components sumx, sumy derived from the measured displacement between New Input Frame 50 and the Previous Input Frame $50_O$. As a result, the convolution process not only upsamples the New Input Frame 50 into WorkRes, it fractionally shifts that upsampled data to compensate for the fractional misalignment not accounted for by the rough integer shifting of the Historic Working Frame 61b in Step 208.

As shown in FIG. 12, the system performs the convolution by sparsely populating the New Working Frame 61a with the low-resolution pixels 51 from the New Input Frame 50. The system then convolves the New Working Frame 61a, so populated, with the convolution kernel 90 in order to "spread" the intensity values of the low-resolution pixels 51 into the New Working Frame's high resolution pixels 62. The value of a particular HiRes pixel 62 may be determined as a weighted sum of the LoRes pixels 51 that are within the kernel's "reach" when the kernel 90 is centered over and associated with that particular HiRes pixel 62.

The kernel's center element is normally moved with fine, HiRes granularity, from HiRes pixel 62 to HiRes pixel 62 and, at each such pixel 62, each of the forty-nine intensity values contained in the forty-nine HiRes pixels under the kernel 90 is multiplied by a corresponding one of the kernel's forty-nine weights to form forty-nine products, and those forty-nine products are added together and "inwardly" deposited in the HiRes pixel 62 located under the kernel's center element. In conventional "inward" convolution, each HiRes pixel 62 is completely determined by one set of associated multiplies and accumulates.

As suggested by the arrows 91 in FIG. 12, however, the preferred system 20 convolves the LoRes pixels 51 into HiRes space by systematically moving the kernel 90 in coarse, LoRes jumps that moves its center element from from LoRes pixel 51 to LoRes pixel 51 and, while stopped at each such LoRes Pixel 51, "outwardly" expanding the one intensity value of that LoRes pixel 51 into forty-nine HiRes pixels 62 based on the forty-nine kernel weights. In essence, the kernel 90 partially populates the forty-nine HiRes pixels 62 that are located under it at each LoRes stop. A particular HiRes pixel 62 in the new working frame 61a does not contain the "whole picture" until after the kernel 90 has made two passes and been centered on several nearby low-res pixels 51 (four in this case). This outward approach to convolution dramatically reduces the number of multiplication operations required relative to standard "inward" convolution, without requiring a complicated methodology for reducing the forty-nine multiplication operations that are normally required for each inwardly determined high-res pixel 61 (i.e. testing for non-zero contributors or methodically keeping track of which high res contributors are non-zero).

As already noted, the preferred system 20 uses two arrays to conveniently accumulate the outwardly convolved data that ultimately represents the convolved value of each HiRes pixel 62 in the new working frame 61a:

(1) a "covar" array (labeled "COVAR") that accumulates the weighted intensities that each HiRes pixel 62 receives from nearby LoRes pixels 51 via the convolution kernel 90 (i.e. $\Sigma W_i I_j$); and (2) a "sum" array (labeled "SUM") that accumulates the sum of the weights associated with the assemblage of the weighted intensities accumulated in the covar array for each such HiRes pixel 62 (i.e. $\Sigma W_i$)

As shown in more detail by the following pseudo-code, the convolution takes place by successively locating the kernel 90 over each LoRes pixel 51, by multiplying the intensity value of that pixel 51 by the forty-nine kernel values, and by accumulating the forty-nine resulting products (weighted intensities) into the forty-nine HiRes pixels 62 that are located under the kernel 90 in the covar array COVAR while simultaneously accumulating the forty-nine weights associated with the weighed intensites of those same HiRes pixels 62 into the sum array SUM:

```
procedure Convolve;
var
   x,y,l,k : integer;
   i,j : integer
begin
   for y := 0 to 63 do
      for x :=0 to 63 do
         for 1 := 0 to 6 do
         begin
            := (192/64) * y + 1 + 7; //const#of pixels added
            for k := 0 to 6 do
            begin
               j := (192/64) * x + k + 7;//7 is a const
               Covar[i,j]:=Covar[i,j] + New Frame[y,x] * Kern[l,k];
               Sum[i,j]:=Sum[i,j] + Kern[l,k];
            end;
         end;
      end;
end;
```

At this point, the New Working Frame 61a exists and is in registration with the historic working frame 61b such that the two may be combined.

Combining the New With the Old

At step 211, as suggested by the combination block 170, the system 20 combines the New Working Frame 61a with a corresponding portion of the Historic Working Frame 61b that was shifted in step 208.

The preferred combination block 170 de-weights the old data by an exponential (1-alpha) amount so that changes in the scene may express themselves at a desired rate. Alpha may range from 0 to 1. If alpha were 0.0625, for example, the combination block 170 would emphasize the new image data relative to the old image data as follows:

combined working frame 61c=93.75% historic+6.25% new

In the present embodiment, alpha≅0.0625. In other embodiments, however, alpha may be manually varied by the user to trade spatial sharpness with speed of response. Alpha may also be dynamically varied for different regions, or even on a pixel by pixel basis.

The attached code implements the combination block 170 as a "virtual" element because:

(1) only one Working Frame 61 functions as the Historic Working Frame 61b and the Combined Working Frame 61c, illustrated and discussed separately herein for clarity; and (2) the image data from the New Input Frame 50 is convolved directly into the Working Frame 61 such that upsampled input frame 61a is never created independent of the Working Frame 61.

The attached code implements the exponential de-weighting of the historic image data by right-shifting the binary representation of each covar value and each sum value, by four bits, in order to divide those values by sixteen. The de-weighted values, being about six percent of their original value, are then subtracted from the covar and sum values corresponding to the New Input Frame 50 and the results are accumulated in the covar and sum arrays of the working frame 61.

Normalizing the Combined Working Frame

At step 212, as suggested by normalization block 80, the system 20 normalizes the contents of the Combined Working Frame 61d by dividing the covar array by the sum array, i.e. by dividing each covar value by a corresponding sum value on a pixel by pixel basis. The result is a Normalized Working Frame 61d (or "quotient frame) shown in FIGS. 6 and 7.

De-Shifting the Combined Working Frame

At step 213, as suggested by the integer and fractional de-shift blocks 131, 132, the system shifts the Normalized Working Frame 61d to the desired position using the tracking shift components Dx1, Dy1 and adx, ady determined by the tracking and smoothing filter 120 in step 207 above. The result is the output frame 60. The code uses pointer arithmetic to accomplish the shift.

Resampling Output Frame to Display Resolution

At step 214, as suggested by the resampling block 180, the system 20 optionally resamples the Output Frame 60 to provide a different display resolution. The display resolution may be chosen at the outset to be different than the resolution of the output frames 60. In this case, the image must be resampled before being presented to the display or recording or storage device. In the preferred embodiment, bilateral interpolation is used to upsample the resolution from three times the resolution of the Input Frame 50 to four times the resolution. Bilateral interpolation is well known in the art. It is a linear interpolation using a linear combination of the four nearest pixels to estimate an internal output pixel value. Coefficients for the four pixels depend upon the position of the new pixel with respect to the old pixel.

Writing the Display Frames

At step 215, as suggested by the connection of the Display Frame 70 to the display device 30 via switch S4, the system 20 writes the Display Frame 70 to the display device to display one frame in a sequence of frames forming a video image or to display a new Display Frame 70 of an increasingly more detailed still image.

Incrementing the Counter

At step 216, the system 20 determines increments a counter variable called frame that is used in the embodiment in the attached code because the data file used as the video source contained a fixed number of frames.

Testing for Completion

At step 217, the system tests the counter variable frame against another variable called maxframe. If further frames are available, flow returns to step 203, and if not processing ends.

What is claimed is:

1. A method of processing low resolution input frames containing undersampled views of an optically imaged scene to produce a higher quality, higher resolution output frame comprising the steps of:

obtaining a sequence of low resolution input frames containing different undersampled views of an optically imaged scene; and for each new low resolution input frame:

measuring a displacement between a previous low resolution input frame and a new low resolution input frame to sub-pixel precision to produce a measured displacement;

coarsely registering a high resolution working frame with the new low resolution input frame based on the measured displacement;

finely registering the new low resolution input frame with the high resolution working frame by expanding the new low resolution input frame into a new high resolution input frame based on the measured displacement; and merging the new high resolution input frame into the high resolution working frame to produce an output frame.

2. The method of claim 1 wherein the step of measuring a displacement between a previous low resolution input frame and a new low resolution input frame to sub-pixel precision to produce a measured displacement is performed in the X and Y directions only.

3. The method of claim 1 wherein the step of measuring a displacement between a previous low resolution input frame and a new low resolution input frame to sub-pixel precision to produce a measured displacement is accomplished by:

measuring the x gradient of a plurality of pixels in the new low resolution frame;

measuring the y gradient of the plurality of pixels in the new low resolution frame; and measuring the difference in intensity between the plurality of pixels in the new low resolution frame and the same plurality of pixels in the previous low resolution frame.

4. The method of claim 1 further comprising the step of dividing the measured displacement into an integer displacement portion and a fractional displacement portion.

5. The method of claim 4 wherein the step of coarsely registering a high resolution working frame with the new low resolution input frame based on the measured displacement operates on the basis of the integer displacement portion.

6. The method of claim 5 wherein the step of coarsely registering a high resolution working frame with the new low resolution input frame based on the measured displacement that operates on the basis of the integer displacement portion comprises the substeps of:

providing a high resolution working frame; and coarsely registering the high resolution working frame with the new low resolution input frame based on the integer displacement portion of the measured displacement.

7. The method of claim 4 wherein the step of finely registering the new low resolution input frame with the high resolution working frame by expanding the new low resolution input frame into a new high resolution input frame based on the measured displacement operates on the basis of the fractional displacement portion.

8. The method of claim 7 wherein the step of finely registering the new low resolution input frame with the high resolution working frame by expanding the new low resolution input frame into a new high resolution input frame based on the measured displacement that operates on the basis of the fractional displacement portion comprises the steps of:

providing a kernel;

fractionally adjusting the kernel based on the fractional displacement value to form a fractionally-shifted kernel; and finely registering the new low resolution input frame with the high resolution working frame by expanding the new low resolution input frame into a new high resolution input frame using the fractionally-shifted kernel.

9. The method of claim 1 comprising the further steps of:

filtering the measured displacements associated with each new low resolution input frame to produce filter values that follow a smooth trajectory while removing jitter; and de-shifting the output frames in accordance with the filter values.

10. The method of claim 1 wherein the low resolution input frames are cropped from higher resolution source frame.

11. The method of claim 1 wherein the output frames are resampled to form display frames of a different resolution.

12. A method of processing low resolution input frames containing undersampled views of an optically imaged scene to produce a higher quality, higher resolution output frames comprising the steps of:

obtaining a previous low resolution input frame containing a previous undersampled view of an optically imaged scene;

obtaining a new low resolution input frame containing a new undersampled view of the optically imaged scene due that is different from the previous undersampled view;

measuring a displacement between the new and previous low resolution input frames to sub-pixel precision to produce a measured displacement;

dividing the measured displacement into an integer displacement portion and a fractional displacement portion;

providing a high resolution working frame;

coarsely registering the high resolution working frame with the new low resolution input frame based on the integer displacement portion of the measured displacement;

providing a kernel;

fractionally adjusting the kernel based on the fractional displacement value to form a fractionally-shifted kernel;

finely registering the new low resolution input frame with the high resolution working frame by expanding the new low resolution input frame into a new high resolution input frame using the fractionally-shifted kernel; and merging the new high resolution input frame into the high resolution working frame.

13. The method of claim 12 wherein the step of coarsely aligning the high resolution working frame with the new low resolution input frame based on the integer displacement portion of the measured displacement is accomplished by integer shifting the high resolution working frame based on the integer displacement value in order to move the high resolution working frame to within a fraction of a high resolution pixel of the new input frame.

* * * * *